(12) United States Patent
Endo et al.

(10) Patent No.: US 7,791,618 B2
(45) Date of Patent: *Sep. 7, 2010

(54) INFORMATION PROCESSING APPARATUS AND METHOD

(75) Inventors: Takaaki Endo, Chiba (JP); Akihiro Katayama, Kanagawa (JP); Masahiro Suzuki, Tokyo (JP); Daisuke Kotake, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/169,926

(22) Filed: Jul. 9, 2008

(65) Prior Publication Data

US 2009/0009522 A1  Jan. 8, 2009

Related U.S. Application Data

(63) Continuation of application No. 10/331,549, filed on Dec. 31, 2002, now Pat. No. 7,411,594.

(30) Foreign Application Priority Data

Jan. 15, 2002 (JP) ............................. 2002-006070
Jan. 15, 2002 (JP) ............................. 2002-006071

(51) Int. Cl.
*G06T 3/60* (2006.01)
*G09G 5/00* (2006.01)
(52) U.S. Cl. ..................................... 345/633; 345/652
(58) Field of Classification Search ................ 345/632, 345/633, 650, 653, 676, 678, 652
See application file for complete search history.

(56) References Cited

U.S. PATENT DOCUMENTS 4,851,897 A 7/1989 Inuma et al. .................. 358/29

(Continued)

FOREIGN PATENT DOCUMENTS

JP 11-168754 6/1999

OTHER PUBLICATIONS

Endo, et al., "Building Image-Based Cybercities by Using Vehicle-Mounted Cameras", Singaku Society, PA 3-4, pp. 276-277 (1997).

(Continued)

*Primary Examiner*—Jeffery A Brier
(74) *Attorney, Agent, or Firm*—Fitzpatrick, Cella, Harper & Scinto

(57) ABSTRACT

In order to improve the operationality of a walk-through system using panorama photography images, the system is provided with a view calculating unit for calculating view information in accordance with a user instruction from an operation unit, the view information including view position information and view direction information; a panorama image storing unit for storing a plurality of panorama images; a path storing unit for storing path information of the panorama images; an advancable path calculating unit for calculating advancable path information at a next dividing point in accordance with the view information and the path information; and an image generating unit for generating a cut-out image from the panorama image in accordance with the view information, generating a sign figure representative of the advancable path in accordance with the advancable path information, and synthesizing the cut-out image and the sign figure to generate a display image.

9 Claims, 27 Drawing Sheets

U.S. PATENT DOCUMENTS

| | | | |
|---|---|---|---|
| 5,191,644 A | 3/1993 | Takeda | 715/790 |
| 5,255,077 A | 10/1993 | Yamazaki et al. | 358/29 |
| 5,568,602 A | 10/1996 | Callahan et al. | 715/500.1 |
| 5,602,564 A | 2/1997 | Iwamura et al. | 345/782 |
| 5,613,055 A | 3/1997 | Shimoura et al. | 345/473 |
| 5,808,613 A | 9/1998 | Marrin et al. | 345/850 |
| 6,097,393 A | 8/2000 | Prouty et al. | 345/419 |
| 6,151,028 A | 11/2000 | Kumagai et al. | 345/427 |
| 6,263,100 B1 | 7/2001 | Oshino et al. | 382/154 |
| 6,335,754 B1 | 1/2002 | Endo et al. | 348/37 |
| 6,346,938 B1 | 2/2002 | Chan et al. | 345/419 |
| 6,366,782 B1 | 4/2002 | Fumarolo et al. | 455/457 |
| 6,388,688 B1 | 5/2002 | Schileru-Key | 345/854 |
| 6,400,362 B1 | 6/2002 | Uchiyama et al. | 345/420 |
| 6,449,013 B1 | 9/2002 | Suzuki et al. | 348/279 |
| 6,452,544 B1 | 9/2002 | Hakala et al. | 342/357.13 |
| 6,559,863 B1 | 5/2003 | Megiddo | 715/753 |
| 6,580,441 B2 | 6/2003 | Schileru-Key | 345/805 |
| 6,597,380 B1 | 7/2003 | Wang et al. | 345/782 |
| 6,694,255 B1 | 2/2004 | Kainuma et al. | 701/209 |
| 6,950,120 B1 | 9/2005 | Endo et al. | 348/36 |
| 6,970,166 B2 | 11/2005 | Kuroki et al. | 345/428 |
| 6,999,083 B2 | 2/2006 | Wong et al. | 345/473 |
| 7,096,428 B2 | 8/2006 | Foote et al. | 715/721 |
| 2002/0113805 A1 | 8/2002 | Li et al. | 345/649 |

OTHER PUBLICATIONS

Hirose, et al., "Building Image-Based Cybercities by Using Vehicle-Mounted Cameras (2)-Generation of Wide-Range Virtual Environment by Using Photorealistic Images", Papers of Second Meeting of Japan Virtual Reality Society, pp. 67-70 (1997).

U.S. Appl. No. 10/314,286, filed Dec. 9, 2002, Takaaki Endo, et al.

| BRANCH POINT ID | COORDINATE | BRANCH POINT NAME |
|---|---|---|
| P1 | u1, v1 | ○○ INTERSECTION |
| P2 | u2, v2 | |
| P3 | u3, v3 | |
| P4 | u4, v4 | |
| ... | ... | |

201 — BRANCH POINT ID
202 — COORDINATE
203 — BRANCH POINT NAME

| PATH ID | START BRANCH POINT | END BRANCH POINT | PATH NAME | START FRAME | END FRAME |
|---|---|---|---|---|---|
| R1 | P1 | P2 | ○× STREET | 000001 | 000100 |
| R2 | P2 | P3 | | | |
| R3 | P3 | P4 | | | |
| ... | ... | ... | | | |

211 — PATH ID
212 — START BRANCH POINT
213 — END BRANCH POINT
214 — PATH NAME
215 — START FRAME
216 — END FRAME

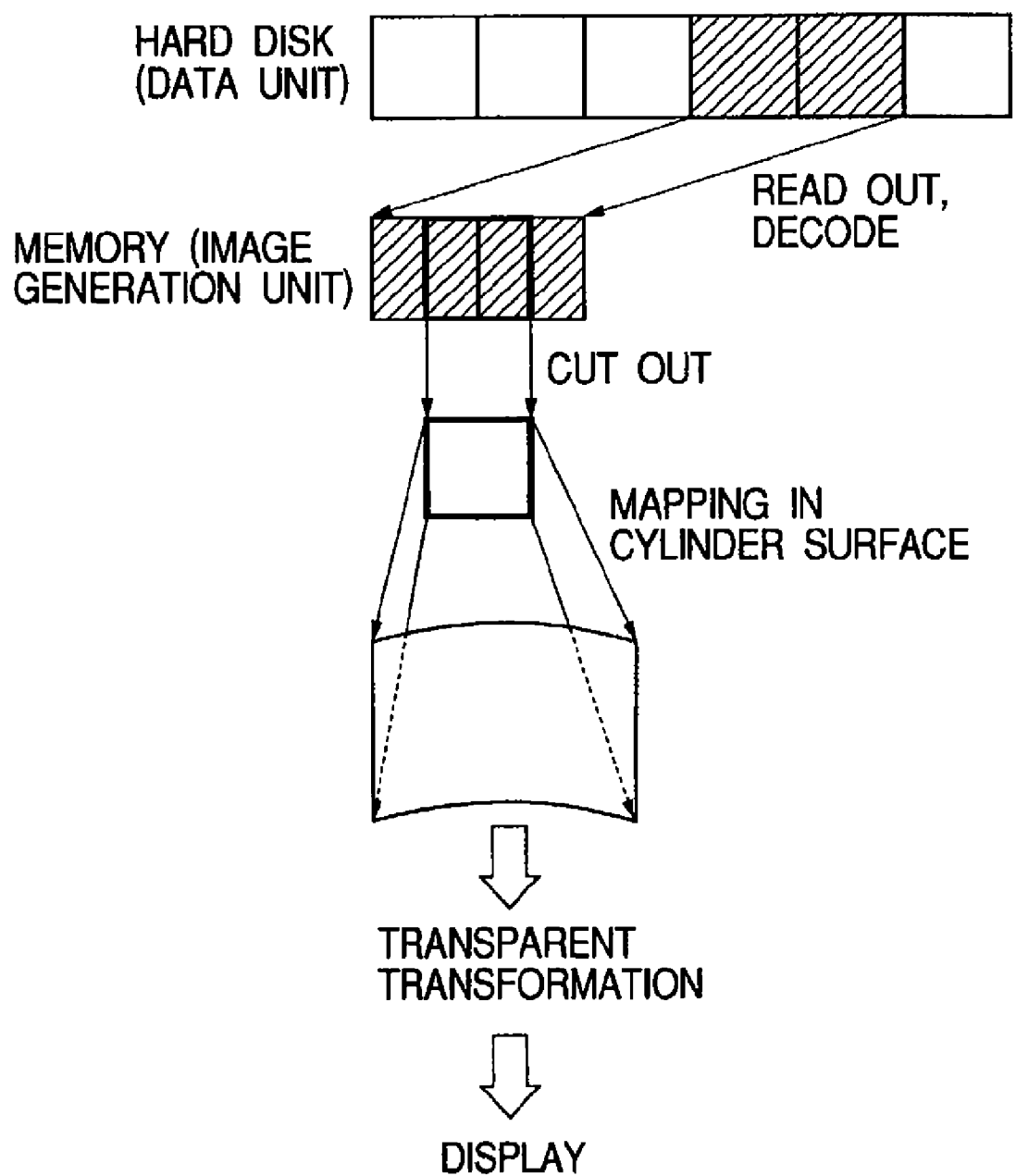

SIDE ELEVATION

UPPER SURFACE FIGURE

WHEN STOPPING

WHEN MOVING

- PATH 3002 WAS SELECTED
- PATH 3003 WAS SELECTED
- PATH 3004 WAS SELECTED
- NO PATH IS SELECTED (PATH 3002 QUICKEST LIKE STRAIGHT PATH IS SELECTED)

- PATH 3002 WAS SELECTED
- PATH 3003 WAS SELECTED
- PATH 3004 WAS SELECTED
- INVALID RANGE

INFORMATION PROCESSING APPARATUS AND METHOD

This application is a continuation application of copending U.S. patent application Ser. No. 10/331,549, filed Dec. 31, 2002.

BACKGROUND OF THE INVENTION

1. Field of the Invention

The present invention relates to walk-throughs in a virtual space.

2. Related Background Art

An approach has been proposed in which a real space is photographed with an image pickup apparatus mounted on a moving body, and in accordance with the taken photography image data, the photographed real space is rendered into a virtual space by using a computer. For example, refer to "Building Image-Based Cybercities By Using Vehicle-Mounted Cameras," by Endo, Katayama, Tamura, Hirose, Watanabe and Tanigawa (SINGAKU SOCIETY, PA-3-4, pp. 276-277, 1997), "Building Image-Based Cybercities By Using Vehicle-Mounted Cameras (2), —Generation Of Wide-Range Virtual Environment By Using Photorealistic Images—," by Hirose, Watanabe, Tanigawa, Endo, Katayama and Tamura (Papers of Second Meeting of Japan Virtual Reality Society, pp. 67-70, 1997), and the like.

As an approach to photographing a real space with an image pickup apparatus mounted on a moving body, and in accordance with the taken photography image data, rendering the photographed real space into a virtual space by using a computer, conventional computer graphics techniques are utilized to realize a geometrical model of a real space in accordance with actually photographed image data. However, there are some limits in terms of correctness, precision, and fidelity to nature of the model. Instead of realizing a model, popular modern image-based rendering (IBR) techniques have been used in which a virtual space is expressed by using photographed images. IBR techniques are based upon photographed images so that a virtual space with a high fidelity to nature can be formed.

In order to configure walk-through by utilizing such IBR techniques, it is necessary to generate and present images at any respective position of an observer in a virtual space. In such a system, correspondence between each frame of photographed image data and its position in a virtual space is stored, and a corresponding frame is reproduced in accordance with the position and view direction of an observer in the virtual space.

In walk-through in such a virtual space, an observer is allowed to look at an image at each view position along a desired direction. To this end, an image at each view position is stored as a panoramic image which encompasses a wider area than the angle of view displayed when the image is reproduced. A proper panoramic image is selected in accordance with the view position and view direction of an observer in the virtual space, and a part of the image reproduced is displayed. For example, the panoramic image along the road on which a car which mounts an image pickup apparatus runs is recorded and reproduced. The observer can feel as if the observer gets in a car and travels along the road. After the observer arrives at an intersection and the observer selects another road different from the road that was previously displayed, the reproduced panoramic image group is changed to another panoramic image group to reproduce the image along a new path.

There are, however, some operational facets of conventional walk-through systems that can be improved.

Since allowable paths at an intersection are not displayed by using a figure such as an arrow and synthesizing the figure and a panoramic photographic image, a user is unable to distinguish between an allowable path and an unallowable path due to lack of photographic data.

With a conventional walk-through system, the motion of an observer on a path is limited to forward or backward motion. Advancement along a path in the view direction of the observer is regarded as forward motion. When the observer arrives at an intersection after the car had traveled on the path, a path nearest to the view direction of the observer is used as the next path. In this case, if a path having an angle of 90° or smaller relative to the forward direction of the path on which the car traveled is to be selected as the next path at the intersection, it is necessary to set the view direction to 90° or smaller relative to the forward direction. However, if the view direction is set to 90° or larger, the forward and backward directions are reversed, and the car moves away from the crossing. Therefore, in a conventional system, one is unable to continue along a view path having an angle of 90° or larger relative to the forward direction.

SUMMARY OF THE INVENTION

The present invention has been made in consideration of the above-described circumstances and aims to improve the ease of operation of a conventional walk-through system.

It is another object of the invention to allow a user of a walk-through system using panoramic images to easily recognize an allowable path.

According to one aspect of the present invention, there is provided an information processing apparatus comprising: view calculating means for calculating view information in accordance with a user instruction from an operation unit, the view information including view position information and view direction information; panoramic image storing means for storing a plurality of panoramic images; path storing means for storing path information of the panorama images; allowable path calculating means for calculating allowable path information at a next dividing point in accordance with the view information and the path information; and image generating means for generating a cut-out image from the panorama image in accordance with the view information, generating a sign figure representative of the allowable path in accordance with the allowable path information, and synthesizing the cut-out image and the sign figure to generate a display image.

It is another object of the invention to allow an observer to easily select a desired path from a plurality of allowable paths at a dividing point without making the observer feel uncomfortable.

According to another aspect of the present invention, there is provided an information processing apparatus comprising: control means for controlling a view position and a view direction; view position and view direction determining means for determining a next view position and a next view direction in accordance with an output from the control means; and reproducing means for acquiring an image corresponding to the view position from an image group including a plurality of images corresponding to a plurality of dividing points or a position on a path interconnecting the dividing points, and reproducing a partial image corresponding to the view direction.

Other features and advantages of the present invention will become apparent from the following description taken in conjunction with the accompanying drawings.

BRIEF DESCRIPTION OF THE DRAWINGS

FIGS. 2A and 2B are diagrams showing examples of how a branch point and a path are written according to the first embodiment.

FIG. 3 is a diagram illustrating a method of cutting out a partial image corresponding to a view from a panoramic photographic image, performing texture mapping of the partial image on a cylindrical plane and performing transparent transformation to create an image having a correct perspective, according to the first embodiment.

DETAILED DESCRIPTION OF THE PREFERRED EMBODIMENTS

Preferred embodiments of the invention will be described with reference to the accompanying drawings.

First Embodiment

The summary of the first embodiment will be given. According to an image supply system of the embodiment, a user can virtually experience a real world while recognizing an allowable path at each branch point.

Figure 1:
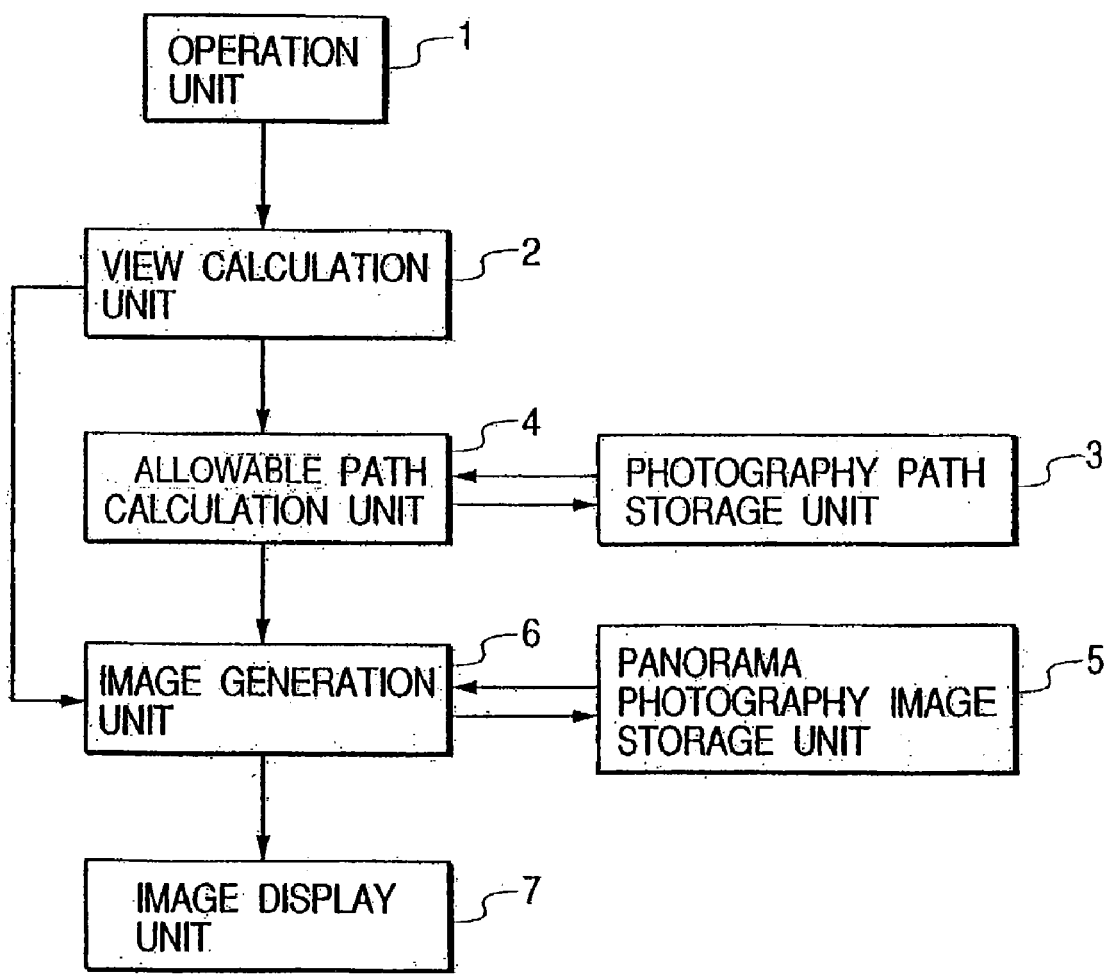
FIG. 1 is a block diagram illustrating processes to be executed by a first embodiment.

FIG. 1 is a block diagram showing the outline structure of an image supply apparatus according to the first embodiment.

An operation unit 1 is, e.g., a joy stick. A user manually moves the operation unit 1 to reflect a user intention. The operation unit 1 is used for designating a panoramic photographic image based on which an image is reproduced, for designating an image to be cut out from a panoramic photographic image and for performing other operations. Information entered by the operation unit is sent to a view calculation unit 2. The operation unit 1 is not limited only to a joy stick but any other instrument such as a mouse, a track ball and a keyboard capable of designating a panoramic photographic image based on which an image is reproduced and designating an image to be cut out from a panoramic photographic image, may be used.

The view calculation unit 2 calculates view information in accordance with operation information entered by the operation unit 1, and sends the calculated view information to an allowable path calculation unit 4 and an image generation unit 6.

A panoramic photographic image storage unit 5 stores data to be passed to the image generation unit 6. The panoramic photographic image storage unit 5 stores panoramic photographic images at a plurality of sites along a path such as a road. A frame number is sequentially assigned, e.g., from the top frame of a group of panoramic photographic images. Each panoramic photographic image may be stored as a plurality of divided images. Each panoramic photographic image stored in the panoramic photographic image storage unit 5 is synthesized from images taken with one or more video cameras such as those capable of full arc photographing along the path such as a road, and is associated with position/posture information at a photographing site.

A photographic path storage unit 3 stores data to be passed to the allowable path calculation unit 4. The photographic path storage unit 3 stores data representative of paths during photographing (hereinafter called a photography path) a panoramic photographic image group to be stored in the panoramic photographic image storage unit. Data representative of the photograph path is constituted of, e.g., a point at which the photography path is branched (hereinafter called a branch point) and a line segment interconnecting branch points (hereinafter called a path). Each of the branch point and path is assigned a unique ID for identifying it. A line segment interconnecting branch points is a straight line or a curve representative of the section between two branch points.

Branch points and paths may be written in various ways. In this embodiment, branch points and paths are written in lists shown in FIGS. 2A and 2B. FIG. 2A is a diagram showing an example of branch point description, and FIG. 2B is a diagram showing an example of path description. As shown in FIG. 2A, in a branch point list 200, for each branch point a branch point ID 201 for identifying the branch point, coordinate data 202 representative of the position of the branch point, and a branch point name 203 are written. The branch point name may not be written. As shown in FIG. 2B, in a path list 210, for each path a path ID 211, start and end branch points 212 and 213 representative of opposite branch points of the path, and a path name 214 are written. The path name may not be written. Start and end frame numbers 215 and 216 are the frame numbers of panorama photography images corresponding to the start and end branch points 212 and 213, the start and end frame numbers being identified in accordance with the position/posture information during photographing associated with the panoramic photographic images.

Although the correspondence between the branch point and frame number is automatically set in accordance with the position/posture information at the photographing site, it may be set manually by a user. In this case, if the positions of respective panoramic photographic images in the panoramic photographic image group between the branch points are allocated at an equal pitch on the line segment interconnecting the branch points, corresponding panoramic photographic image data can be generated and stored without using the position/posture information at each photographing site.

In accordance with the view information sent from the view calculation unit 2 and the photography path information sent from the photography path storage unit 3, the allowable path calculation unit 4 calculates the allowable path at the next branch point and sends the calculated allowable path to the image generation unit 6. More specifically, first the next branch point is obtained from the view information. The allowable path having the start branch point as the next branch point can be obtained from the photography path data.

In accordance with the view information sent from the view calculation unit 2, the image generation unit 6 acquires from the panoramic photographic image storage unit 5 the panoramic photographic image from which an image is reproduced, and then generates a cut-out image in accordance with the view information. For example, the process illustrated in FIG. 3 is performed. First, a panoramic photographic image based on which an image is reproduced is acquired from the panoramic photographic image storage unit 5. In this case, in accordance with view direction information, only a division image necessary for reproducing an image may be acquired. Next, in accordance with the view direction information, a necessary partial image is cut out from the full arc panoramic photographic image or division image. The cut-out partial image is texture-mapped on a cylindrical plane and then subjected to transparent transformation to thereby generate a central projection image matching the view information.

Figure 4:
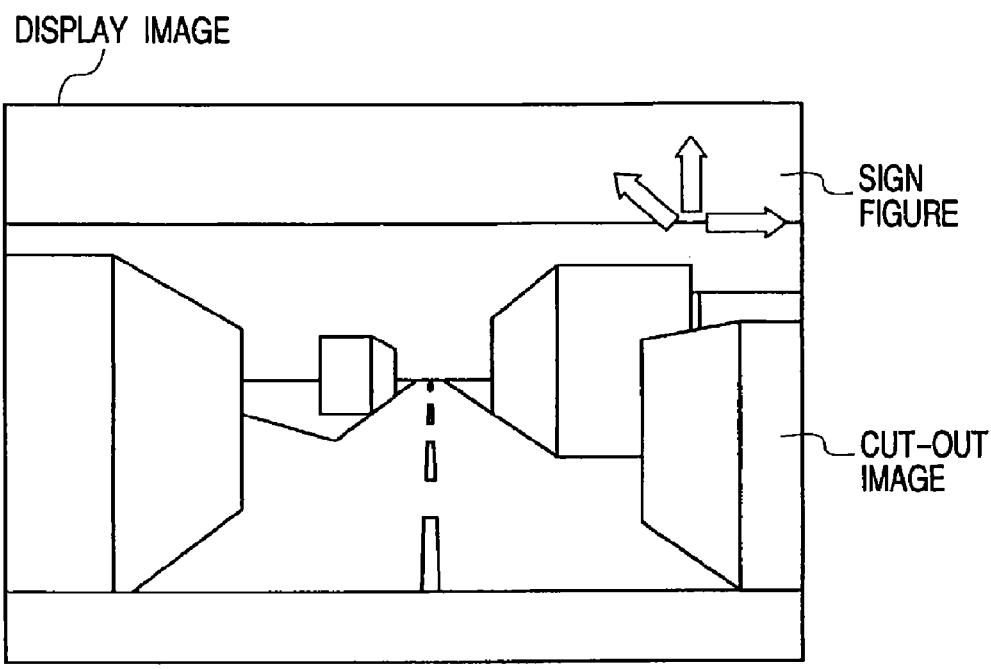
FIG. 4 is a diagram illustrating how an image cut out from a panoramic photographic image and a graphical sign figure representative of an allowable path are synthesized, according to the first embodiment.

As shown in FIG. 4, in accordance with the allowable path information supplied from the allowable path calculation unit 4, the image generation unit 6 generates a graphical sign figure such as an arrow indicating an allowable path at the next branch point, and synthesizes the graphical sign image and the cut-out image.

Figure 5:
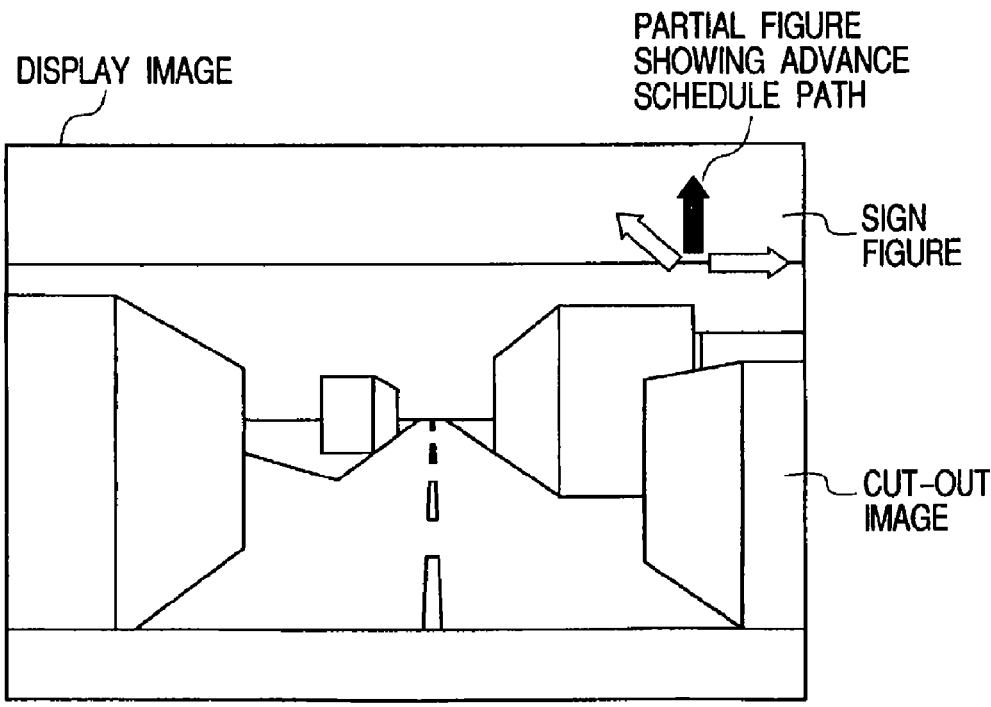
FIG. 5 is a diagram showing an example of a display image in which the attribute such as color of a partial figure representative of an advance estimate path, according to the first embodiment.

As shown in FIG. 5, it is possible to make it easy for a user to recognize the advance estimate path by changing the attribute such as color of a partial figure of the graphic sign representative of the advance estimate path at the next branch point. It is also possible to make it easy for a user to recognize the advance direction by rotating the whole graphical sign figure in accordance with the user view direction. The graphical sign figure is not limited only to an arrow, but any graphic sign figure may be used if it represents the allowable path or advance estimate path. The graphical sign figure may be replaced with an image or a character. A path not allowable may be represented by a graphic sign figure, an image or a character.

An image display unit 7 is, e.g., a projector and a screen and acquires a display image generated by the image generation unit 6 to display it. The image display unit 7 is not limited only to a screen and a projector, but it may be any unit so long as it can display an image. For example, the image display unit may be a CRT or a liquid crystal monitor. A plurality of image display units 7 may be prepared. In this case, a user can view a wide view image, and the number of image generation units 6 and the number of panorama photography image storage units 5 are the same as the number of image display units 7. A graphical sign figure representative of an allowable path may be displayed on some or all of a plurality of image display units.

Figure 6:
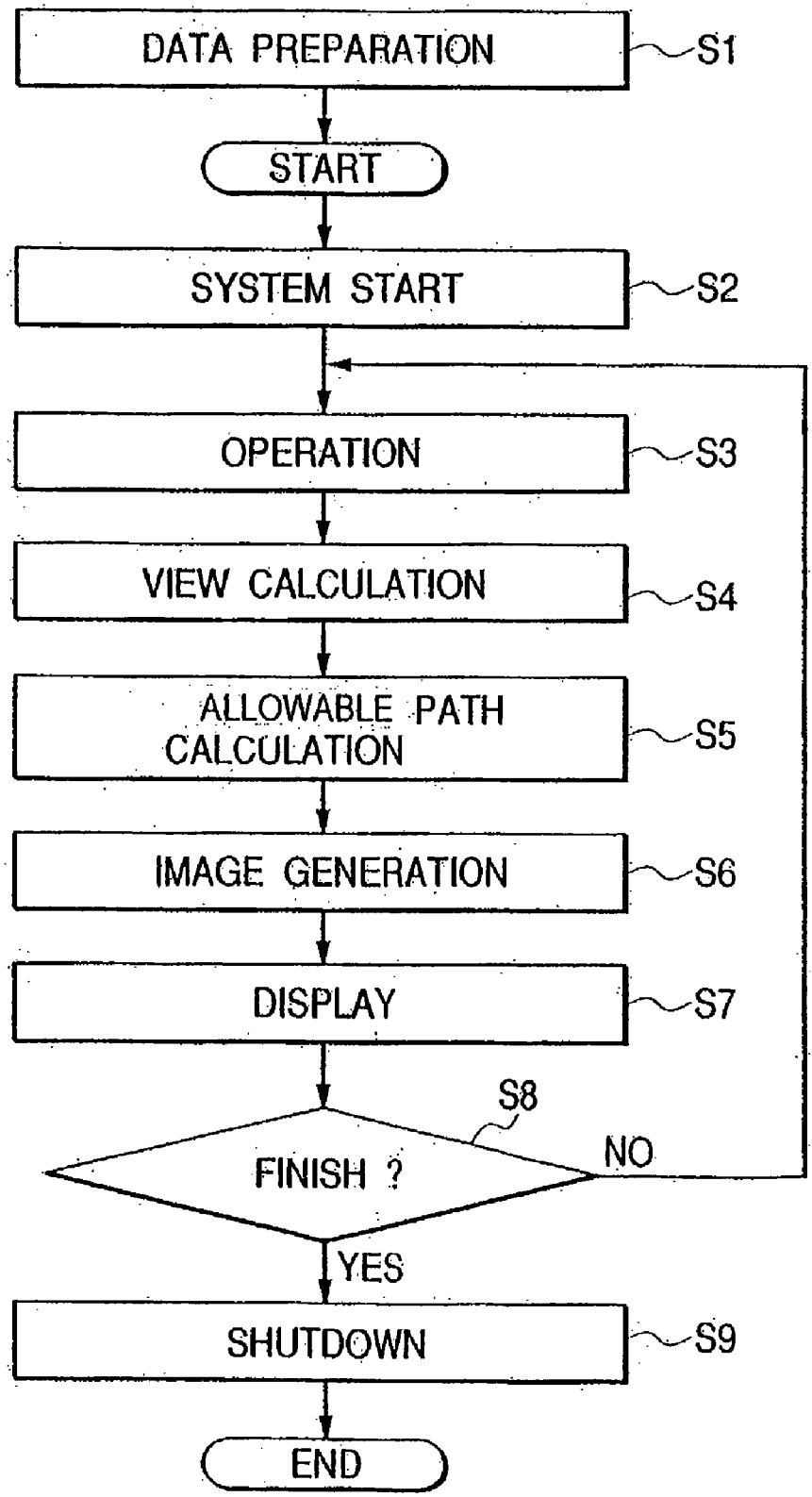
FIG. 6 is a flow chart illustrating processes to be executed by an image supply system according to the first embodiment.

The control procedure of the image supply system of the first embodiment constructed as above will be described next. FIG. 6 is a flow chart illustrating the procedure to be executed by the image supply apparatus of the first embodiment.

At Step S1, data is prepared. Namely, Step S1 prepares text data or the like to be stored in the photography path storage unit 3 and image data to be stored in the panorama photography image storage unit 5.

After the data preparation, the system is activated at Step S2. At Step S3, the operation unit 1 is manipulated and operation information is sent to the view calculation unit 2.

Next at Step S4, in accordance with the operation information entered by the operation unit 1, the view calculation unit 2 calculates the view information and sends the calculated view information to the allowable path calculation unit 4 and image generation unit 6.

Next at Step S5, in accordance with the view information received from the view calculation unit 2 and the photography path information received from the photography path storage unit 3, the allowable path calculation unit 4 calculates an allowable path at the next branch point and sends it to the image generation unit 6.

Next at Step S6, in accordance with the view information supplied from the view calculation unit 2, the image generation unit 6 acquires from the panorama photography image storage unit 5 the panoramic photographic image based on which an image is reproduced, and generates a cut-out image corresponding to the view information. Further, in accordance with the allowable path information supplied from the allowable path calculation unit 4, the image generation unit 6 generates a graphical sign figure representative of an allowable path and synthesizes the graphical sign figure and the cut-out image.

Next, at Step S7, the display image generated by the image generation unit 6 is displayed on the image display unit 7.

Thereafter, it is checked at Step S8 whether the system is to be terminated. If the system is to be terminated, the system is terminated at Step S9, whereas if not, the flow returns to Step S3 to repeat the processes described above.

In this embodiment, the graphical sign figure representative of an allowable path is synthesized with a cut-out image. The embodiment is not limited only to such a case. The graphical sign figure representative of an allowable path may be displayed on another display unit different from the image display unit 7, without synthesizing the graphic sign and cut-out image.

The position and size of a graphical sign may be made changeable. The graphical sign figure may be selectively displayed or not displayed.

As described above, according to the first embodiment, a user of the walk-through system utilizing panorama photography images can easily recognize an allowable path and also an advance estimate path at the next branch point.

Modification of First Embodiment

In this modification, a map image storage unit is provided, a map image is synthesized with a panorama photography image, and a path figure indicating all allowable paths is synthesized with the map image to present it to a user.

Figure 7:
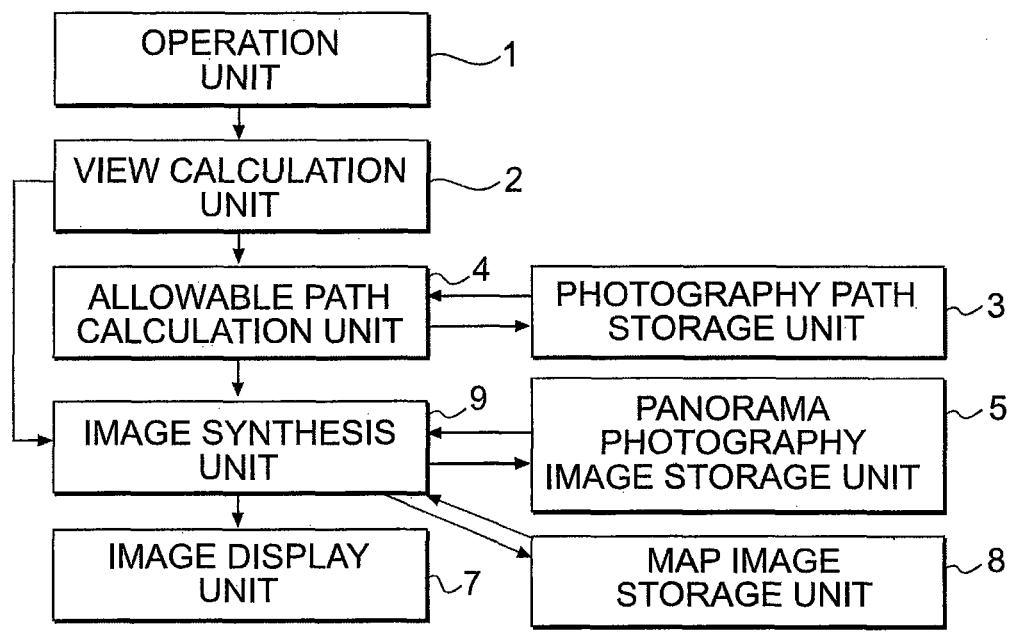
FIG. 7 is a block diagram illustrating processes to be executed by the modification of the first embodiment.

FIG. 7 is a block diagram showing the outline structure of an image supply system according to the modification. In FIG. 7, constituent elements similar to those of the image supply system (FIG. 1) of the first embodiment are represented by identical reference numerals and the detailed description thereof is omitted. A different point of the modification resides in that the system has a map image storage unit 8 and that the image generation unit 6 of the first embodiment is replaced with an image synthesis unit 9.

The map image storage unit 8 stores data to be passed to the image synthesis unit 9. For example, the map image storage unit 8 stores a map image of a photographing site associated with a panorama photography image.

Figure 8:
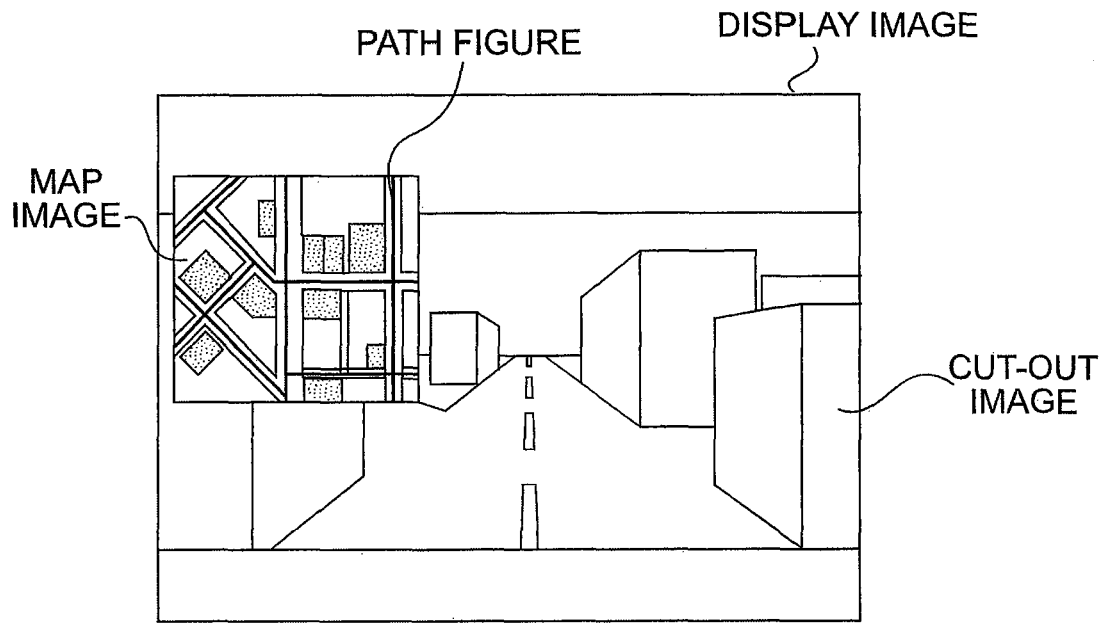
FIG. 8 is a diagram illustrating how a cut-out image, a map image and a path image are synthesized, according to the modification of the first embodiment.

In accordance with the view information sent from the view calculation unit 2, the image synthesis unit 9 acquires from the panoramic photographic image storage unit 5 a panoramic photographic image based on which an image is reproduced. The image synthesis unit 9 also acquires from the map image storage unit 8 a map image corresponding to the view information sent from the view calculation unit 2. In accordance with the photography path sent from the photography path storage unit 3, the image synthesis unit 9 generates a path figure representative of a path image constituted of, e.g., straight lines. As shown in FIG. 8, the image synthesis unit 9 synthesizes the cut-out image, map image and path figure to display a synthesized display image.

Figure 9:
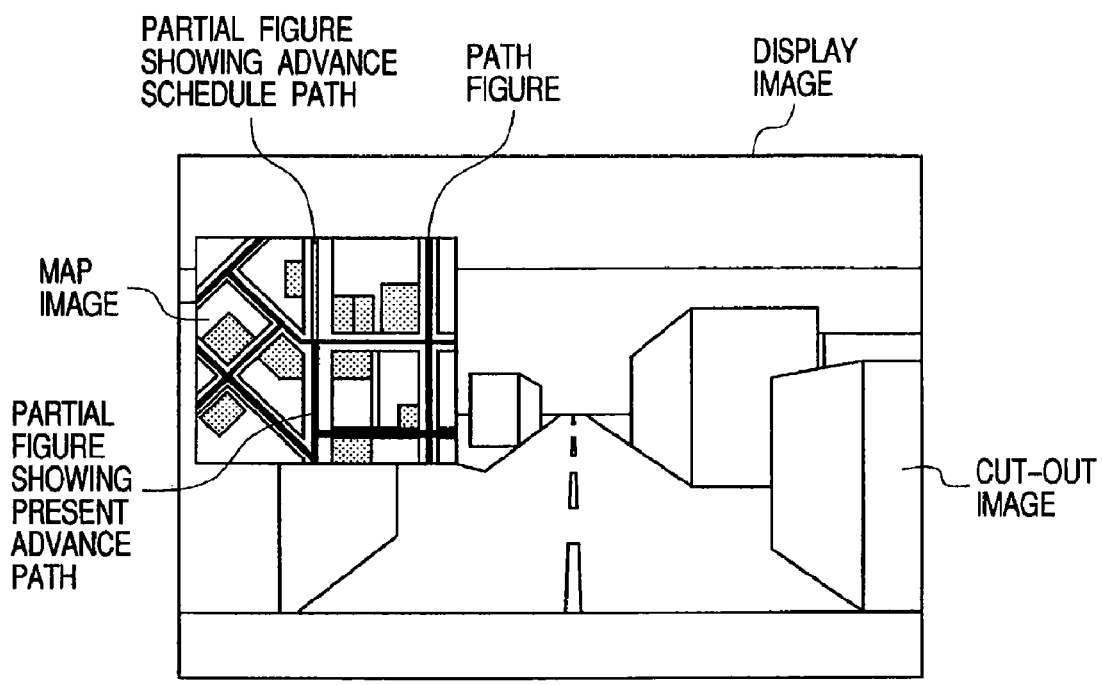
FIG. 9 is a diagram showing an example of a display image when the attribute such as color of a partial figure representative of an advance estimate path and a partial figure representative of a present advance path is changed.
Figure 10:
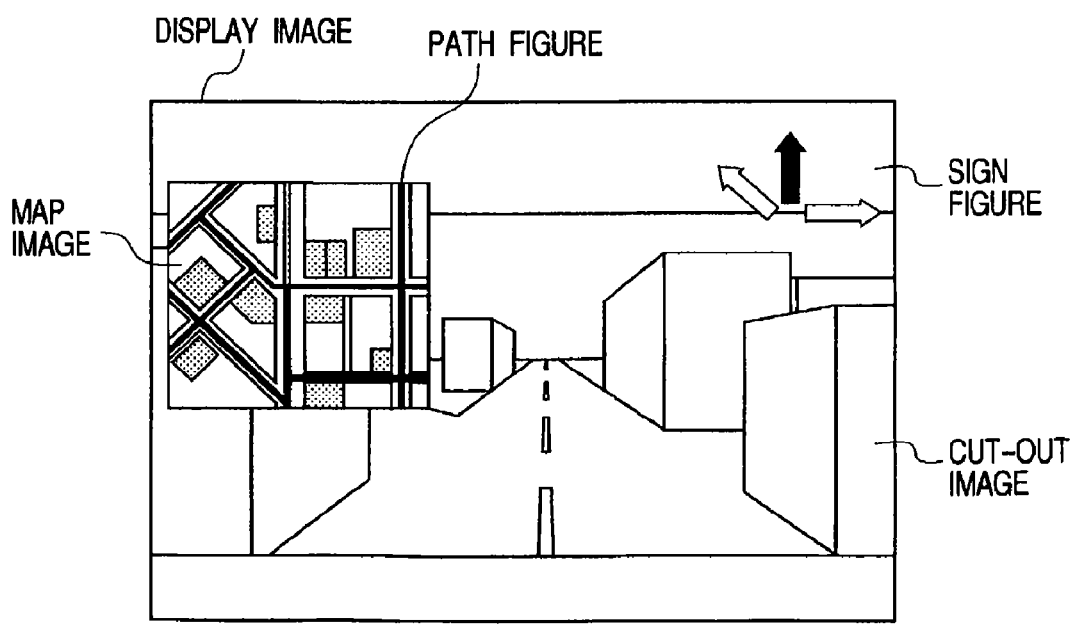
FIG. 10 is a diagram illustrating how a cut-out image, a map image and a path image are synthesized, according to the modification of the first embodiment.

As shown in FIG. 9, in accordance with the allowable path information supplied from the allowable path calculation unit 4 and the view information sent from the view calculation unit 2, the attribute such as color of a partial figure of the path figure representative of the advance estimate path at the next branch point may be changed to make it possible for a user to easily recognize the advance estimate path. The attribute such as color of a partial figure of the path figure representative of the present advance path may be changed to make it possible for a user to easily recognize the present advance path. A figure such as an arrow indicating the present view position and direction may be drawn on the map image. As shown in FIG. 10, a path figure and a graphical sign figure may be displayed at the same time.

In accordance with view direction information of a user, the whole of the map image and path figure may be rotated to make it possible for the user to easily recognize the advance direction. The path figure is not limited only to straight lines, but any figure capable of showing the path image, allowable path or advance estimate path may also be used. The path figure may be replaced with images, characters or the like. An unallowable path may be represented by a path figure, images, characters or the like.

Figure 11:
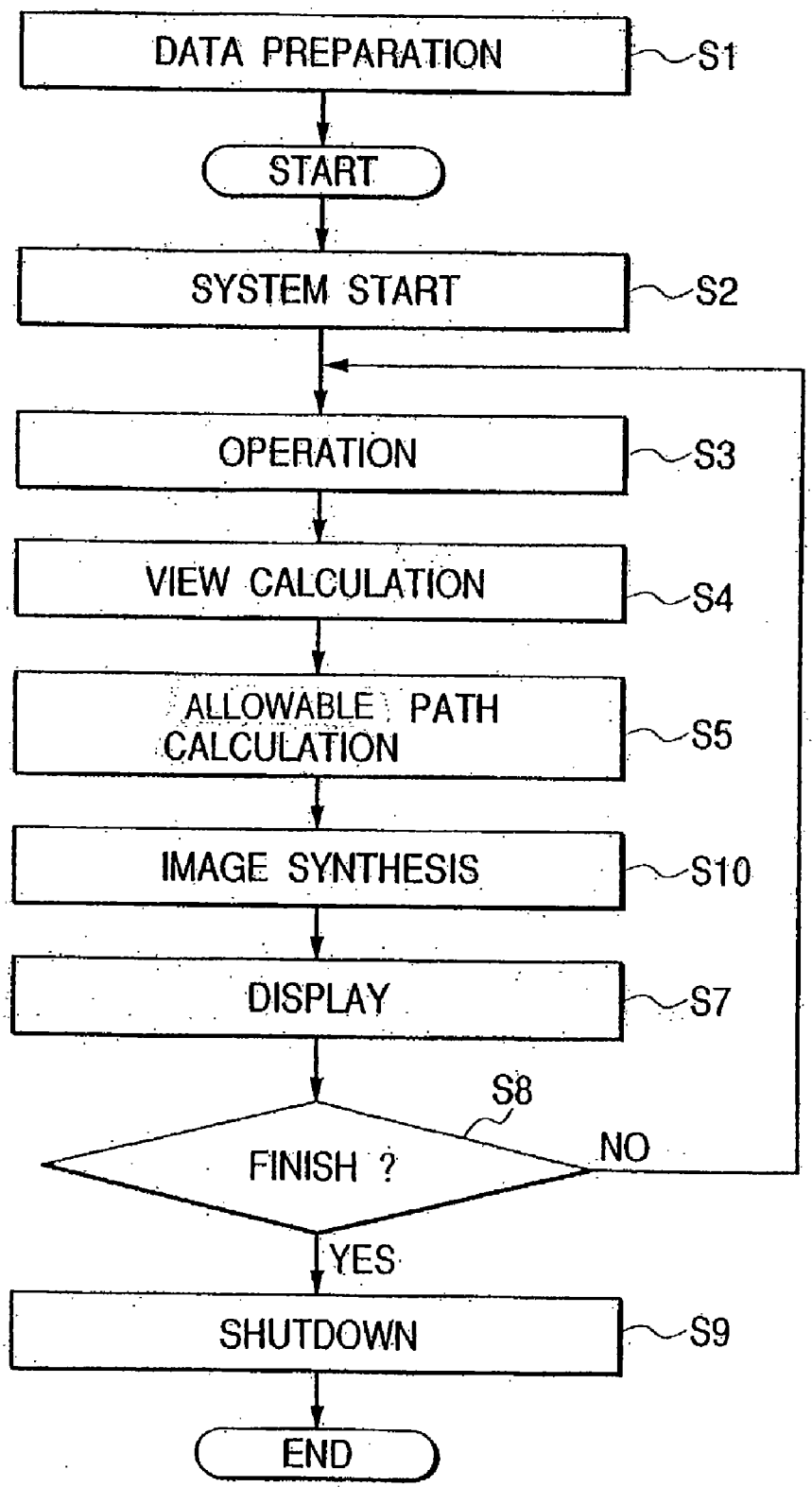
FIG. 11 is a flow chart illustrating processes to be executed by an image supply system according to the modification of the first embodiment.

The control procedure of the image supply system of the modification of the first embodiment constructed as above will be described next. FIG. 11 is a flow chart illustrating the procedure to be executed by the image supply apparatus of the modification. Steps of executing processes similar to those shown in the flow chart (FIG. 6) of the first embodiment are represented by identical reference symbols and the detailed description thereof is omitted. Different points from the first embodiment will be described in the following.

Similar to the first embodiment, in the modification, data is prepared at Step S1. Namely, Step S1 prepares data to be stored in the photography path storage unit 3, data to be stored in the panorama photography image storage unit 5 and data to be stored in the map image storage unit 8.

In the modification, after Step S5, image synthesis is performed at Step S10. Namely, in accordance with the view information supplied from the view calculation unit 2, the image synthesis unit 9 acquires from the panorama photography image storage unit 5 a panorama photography image based on which an image is reproduced, and generates a cut-out image corresponding to the view information. The image synthesis unit 9 also acquires from the map image storage unit 8 a map image corresponding to the view information sent from the view calculation unit 2. In accordance with the photography path information sent from the photography path storage unit 3, the image synthesis unit generates a path figure representative of a path image constituted of, e.g., straight lines. The image synthesis unit synthesizes the cut-out image, map image and path figure.

In this modification, a map image and a path figure are synthesized with a cut-out image. The modification is not limited only to such a case. The map image and path figure may be displayed on another display unit different from the image display unit 7, without synthesizing them with the cut-out image.

The position and size of each of a map image and a path figure may be made changeable. The map image or path figure may be selectively displayed or not displayed.

An initial view position at the start-up of the system may be designated by designating a point on the map image with the operation unit 1 or another operation unit not shown. An initial view direction starting from the designated point as the origin may be designated by designated with the operation unit 1 or another operation unit not shown.

As described above, according to the modification of the first embodiment, a user of the walk-through system utilizing panoramic photographic images can easily recognize all allowable paths, an advance estimate path at the next branch point and the present advance path. The initial view position or initial view direction at the start-up of the system can be designated on the map image.

Second Embodiment

A virtual space walk-through system of the second embodiment will be described. In the second embodiment, panoramic image data is generated from photographic image data taken with a plurality of photographing apparatus mounted on a movable body such as a car, and this panoramic image data is stored in correspondence with a position on a map corresponding to an actual space. In accordance with a view position (position on the map) and a view direction of an observer in the virtual space, a display image is created from the stored panoramic image data to thereby realize virtual space walk-through.

Figure 12:
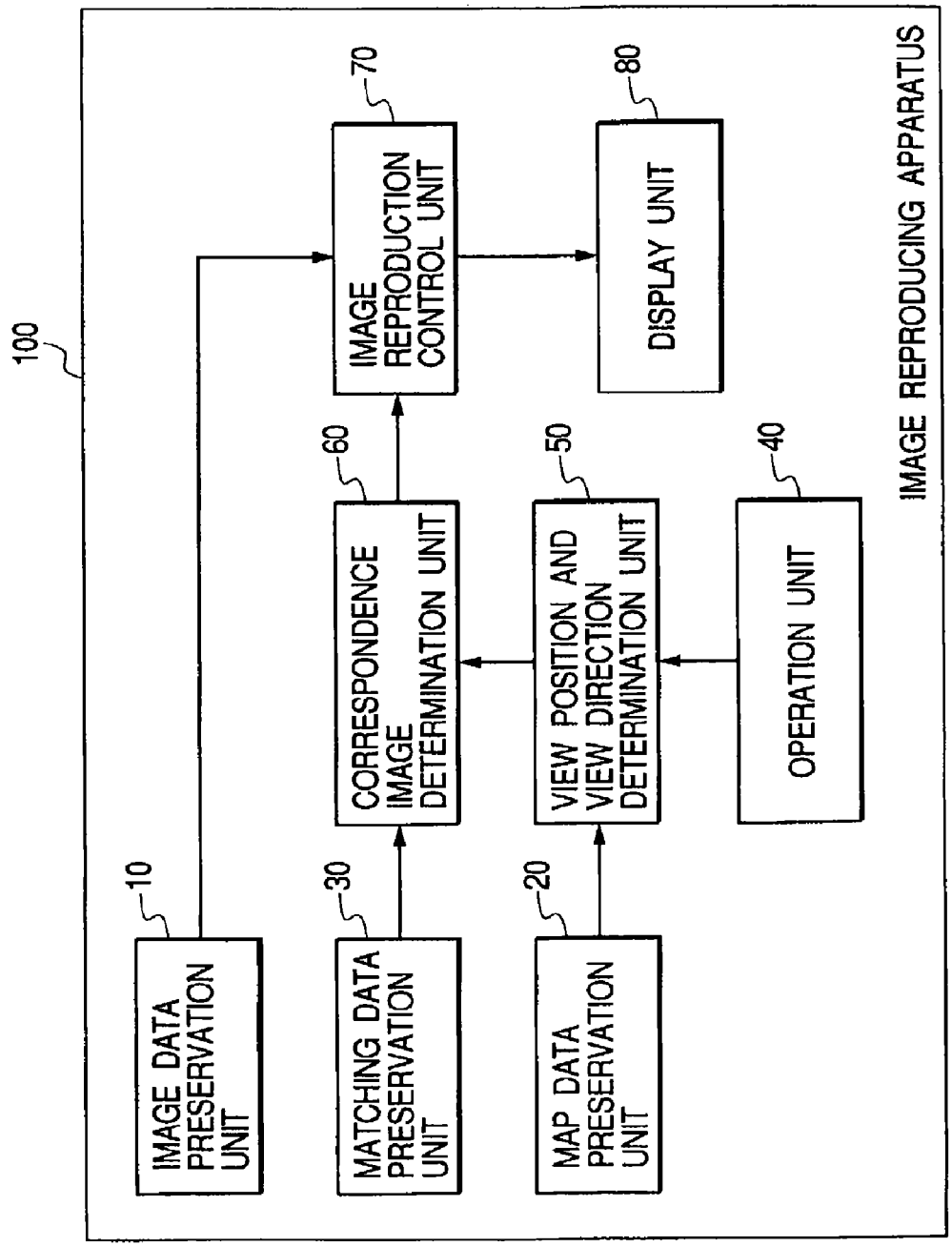
FIG. 12 is a functional block diagram explaining the structure of a walk-through system according to a second embodiment.

FIG. 12 is a functional block diagram showing the structure of the walk-through system of the embodiment. An image reproducing apparatus 100 constituting the walk-through system has: an image data preservation unit 10; a map data preservation unit 20; a matching data preservation unit 30; an operation unit 40; a view position and direction determination unit 50; a correspondence image determination unit 60, an image reproduction control unit 70; and a display unit 80.

Figure 13:
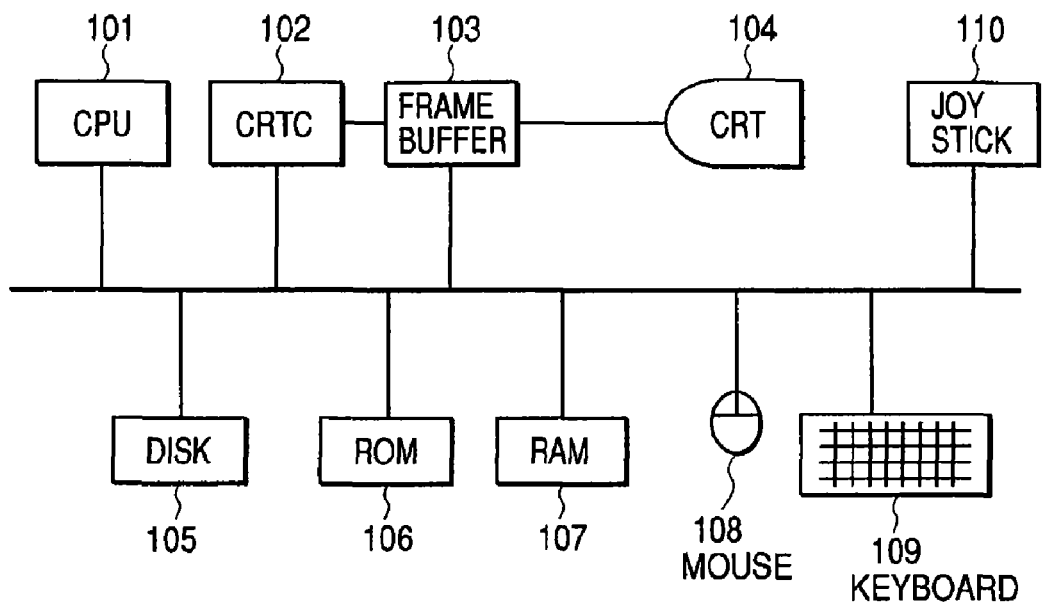
FIG. 13 is a block diagram showing the hardware structure of an image reproducing apparatus 1 according to the second embodiment.

FIG. 13 is a block diagram showing the hardware structure of the image reproducing apparatus 100. The hardware structure shown in FIG. 13 is similar to the hardware structure of a general personal computer. Referring to FIG. 13, a disk 105 constitutes the image data preservation unit 10. The disk 105 constitutes not only the image data preservation unit 10 but also the map data preservation unit 20 and matching data preservation unit 30 shown in FIG. 12.

A CPU 101 executes programs stored in the disk 105, a ROM 106, a RAM 107, or an external storage unit (not shown) so that it constitutes the view position and direction determination unit 50, correspondence image determination unit 60 and image reproduction control unit 70.

CPU 101 issues various display instructions to a display controller 102 so that a desired image is displayed on a display unit 104 in cooperation with the display controller 102 and a frame buffer 103. In FIG. 13, although a CRTC and a CRT are used as the display controller 102 and display unit 104, the display unit 104 is not limited only to a cathode ray tube but it may obviously be a liquid crystal display unit or the like. CRTC 102, frame buffer 103 and CRT 104 constitute the display unit 80 shown in FIG. 12. A mouth 108, a keyboard 109 and a joy stick 110 are used for a user to input data to the image reproducing apparatus 1, and constitute the operation unit 40 shown in FIG. 12.

Next, the operation of the image reproducing apparatus 1 of the walk-through system of this embodiment constructed as above will be described.

The image data preservation unit 10 stores panoramic image data corresponding to each position on a map. The map data preservation unit 20 stores at least map data including data of a position on the map corresponding to the panoramic image data stored in the image data preservation unit 10. The matching data preservation unit 30 stores correspondence information between the panoramic image data stored in the image data preservation unit 10 and map data stored in the map data preservation unit 20.

Figure 14:
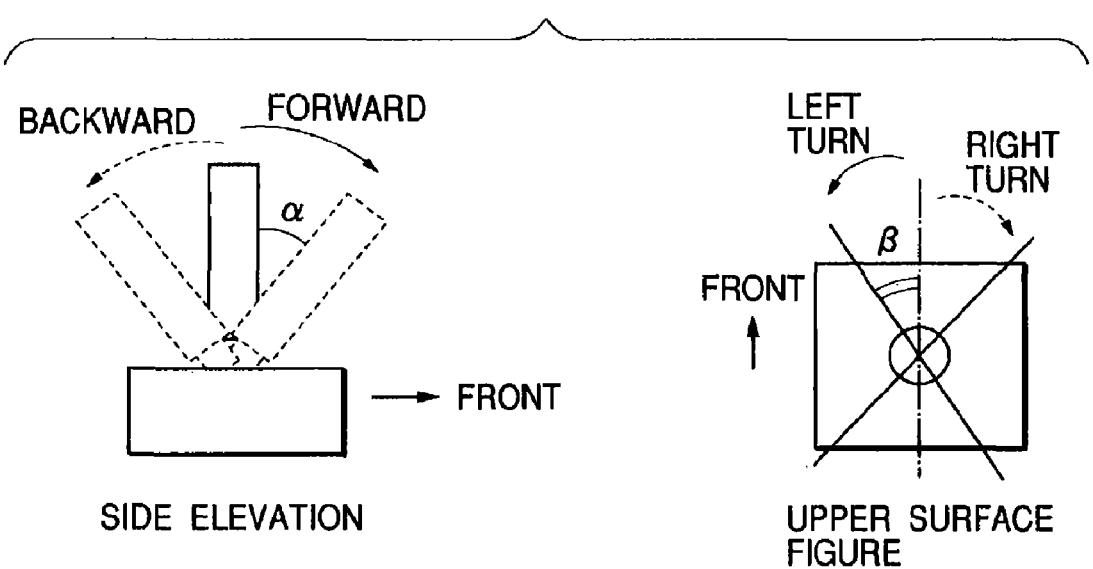
FIG. 14 is a diagram illustrating the manipulation of a joy stick of the walk-through system of the second embodiment.

The operation unit may be a mouse, a keyboard, a joy stick or the like. The operation unit 40 creates a motion parameter of a view position and a rotation parameter of a view direction. In this embodiment, although a joy stick is used as the operation unit 40, another input device such as a game controller may also be used. FIG. 14 is a diagram showing the correspondence between the manipulation of the joy stick of the operation unit 40 and motion and rotation parameters. Tilt and rotation of the joy stick can be controlled independently. In this embodiment, backward and forward tilts of the joy stick correspond to the motion of a view in the virtual space, and right and left twists of the joy stick correspond to a change in a view direction.

Figure 15:
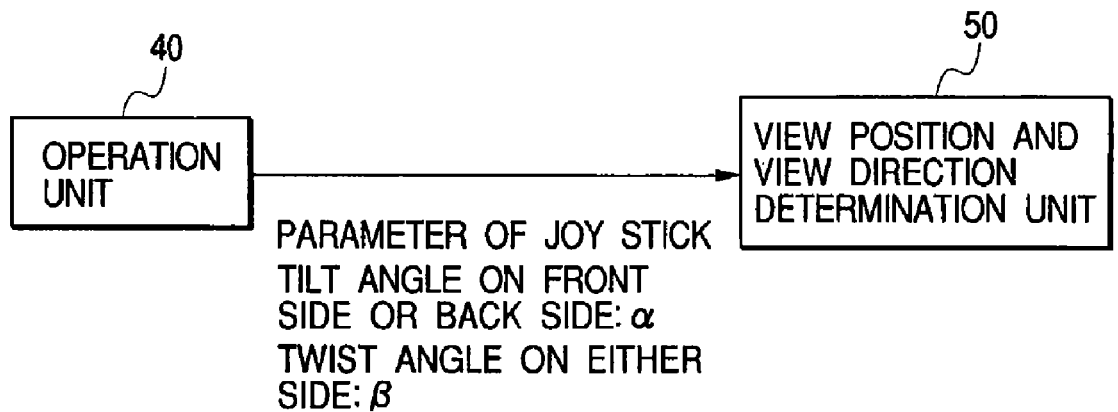
FIG. 15 shows a data flow in an operation unit 40 of the walk-through system of the second embodiment.

FIG. 15 is a diagram showing a data flow of the operation unit 40. The operation unit 40 supplies the view position and direction determination unit 50 with a joy stick forward/backward tilt angle $\alpha$ ($\alpha>0$, a negative value when the joy stick is tilted backward) as a motion parameter and a joy stick right/left twist angle $\beta$ ($\beta>0$, a negative value when the joy stick is tilted or turned right) as a rotation parameter.

In accordance with the motion and rotation parameters from the operation unit 40, the view position and direction determination unit 50 determines a view position (position on the map) and a view direction of an observer relative to the map data stored in the map data preservation unit 20.

Figure 16:
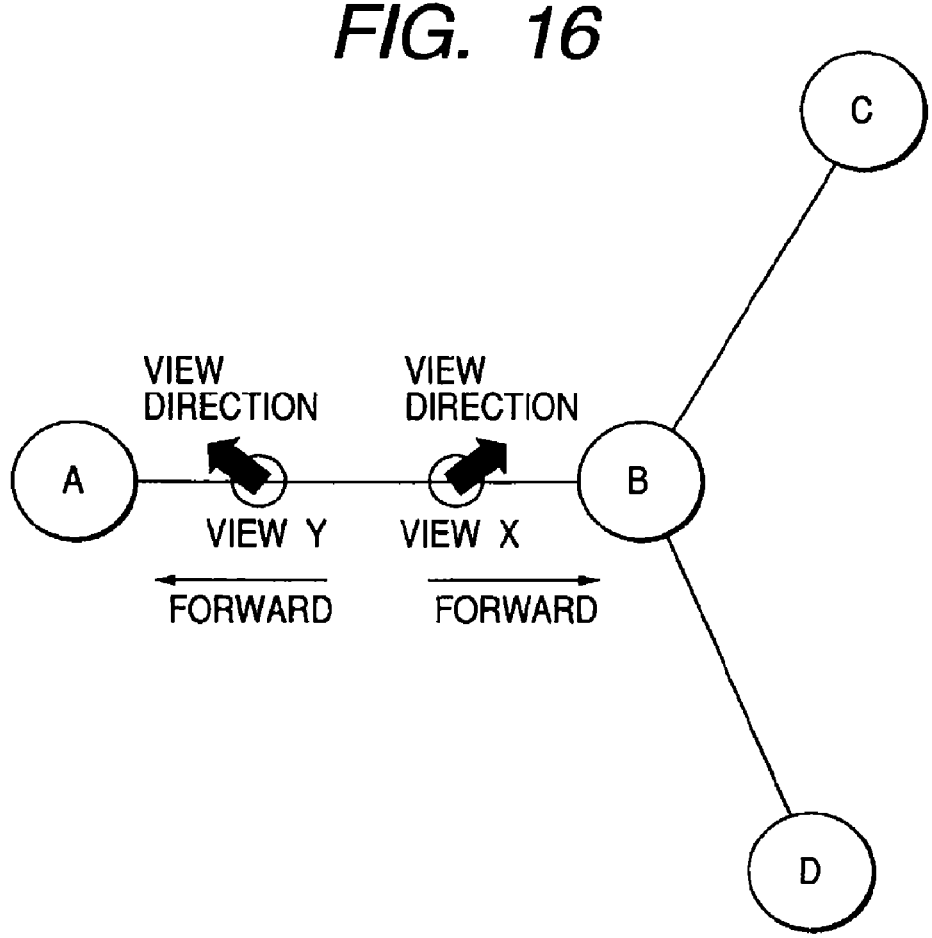
FIG. 16 is a diagram showing a motion of an observer in a virtual space of the walk-through system of the second embodiment.

FIG. 16 is a diagram illustrating a motion of an observer in the virtual space according to the embodiment. In this embodiment, the motion of an observer in the virtual space is limited to a motion on a path (one-dimensional motion) to make the observer move forward or backward on the path. In the example shown in FIG. 16, an observer can move only on paths AB, BC and BD. A direction along which an observer advances depends upon whether the observer is moving or stopped.

Figure 17A:
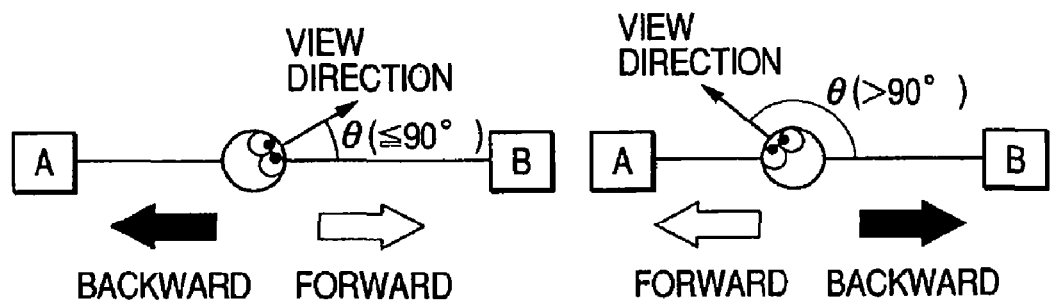
FIGS. 17A and 17B are diagrams illustrating advance direction control according to the second embodiment.
Figure 17B:
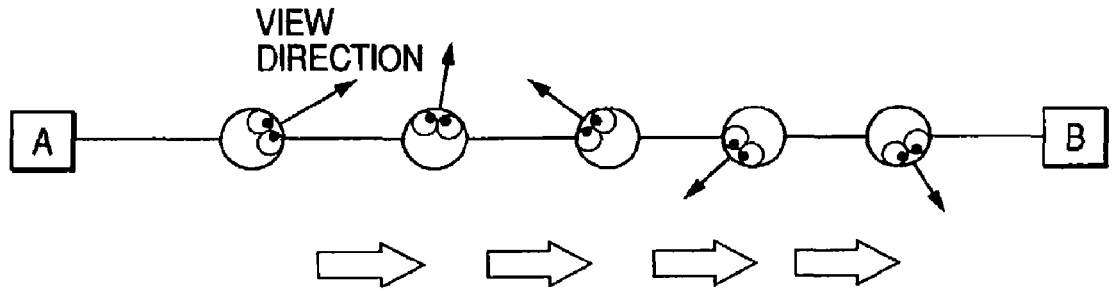

FIGS. 17A and 17B are diagrams illustrating the advance direction of an observer according to the embodiment. As shown in FIG. 17A, while an observer stops, a direction near the view direction of the observer is regarded as a forward advance direction. If the absolute value of an angle $\theta$ between a line segment AB and the view direction angle is 90° or smaller, the direction from A to B is a forward advance direction. If the absolute value of the angle $\theta$ is larger than 90° and equal to or smaller than 180°, the direction from B to A is a forward advance direction. As shown in FIG. 17B, while an observer moves, an advance direction is maintained to be the same direction, irrespective of the view direction. Namely, for example, after the observer starts a forward motion from A to B (after the joy stick is leant forward at $|\theta|<90°$), the observer continues moving along the direction from A to B while the observer moves (while the joy stick is leant forward) irrespective of any direction of the view direction.

Figure 18:
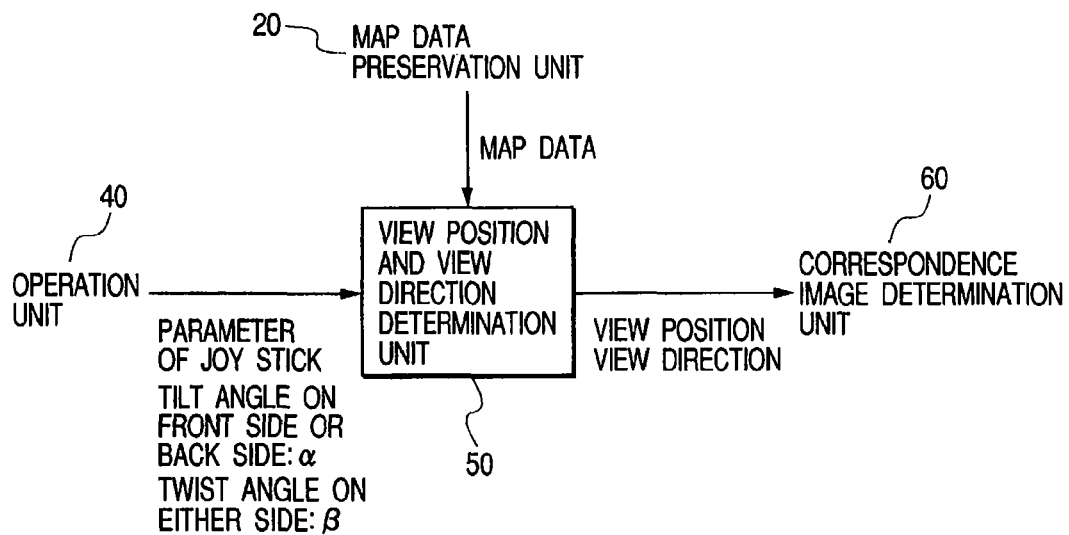
FIG. 18 is a diagram illustrating data flow in a view position and direction determination unit 50 of the walk-through system of the second embodiment.

FIG. 18 is a diagram showing the data flow of the view position and direction determination unit 50. The view position and direction determination unit 50 reads map data from the map data preservation unit 20 and supplies the correspondence image determination unit 60 with the view position and direction of an observer on the map.

In accordance with the information of the view position and direction of the observer, the correspondence image determination unit 60 determines an image ID of an image necessary for displaying the image on the display unit 80.

Figure 19:
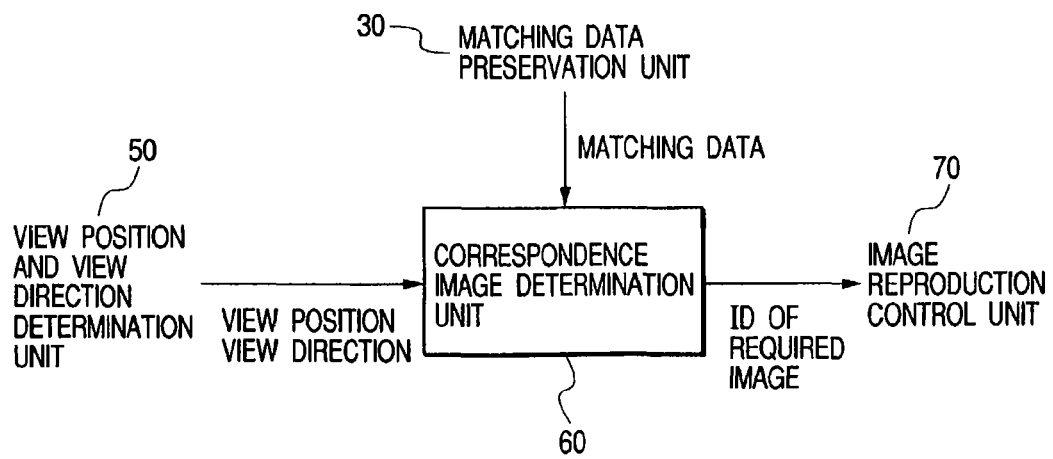
FIG. 19 is a diagram illustrating data flow in a correspondence image determination unit 60 of the walk-through system of the second embodiment.

FIG. 19 is a diagram showing a data flow of the correspondence image determination unit 60. Image data stored in the image data preservation unit 10 necessary for reproducing the image on the display unit 80 is determined from the view position and view direction of the observer in the virtual space determined by the view position and direction determination unit and from the matching information data between the map and image stored in the matching data preservation unit 30, and the ID of the determined image is passed to the image reproduction control unit 70.

Figure 20:
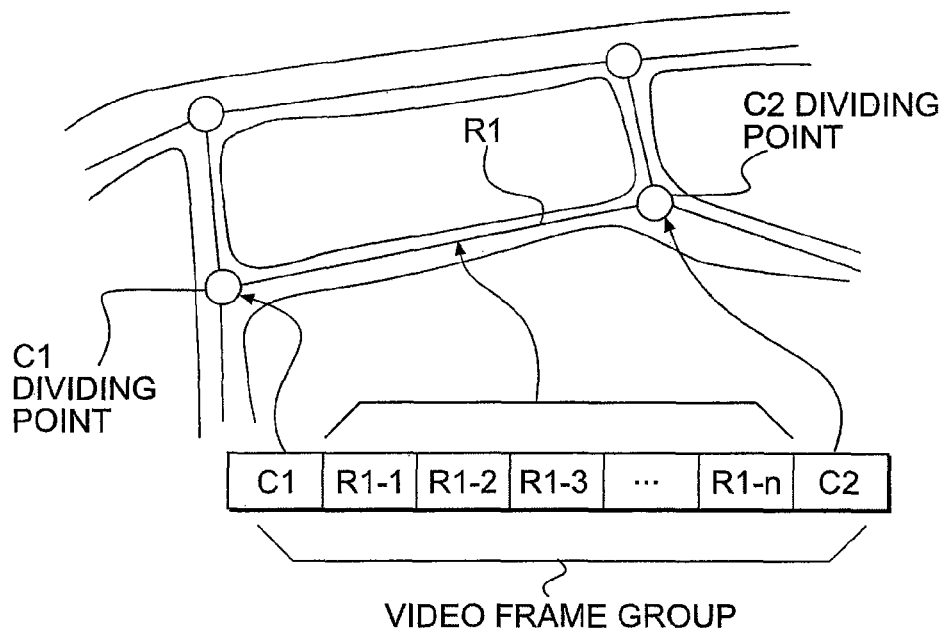
FIG. 20 is a diagram showing the correspondence between a panorama photography image and map data using a path and a dividing point.

In this embodiment, the matching data preservation unit 30 uses the following data storage format. A crossing point (branch point) and a turning corner are used as a dividing point. A line segment between adjacent dividing points is used as a road. An ID is assigned to each of dividing points and roads. These IDs are affixed to the panorama image data. A number is sequentially assigned to a panorama image data group corresponding to one road. This arrangement is illustrated in FIG. 20. In the example shown in FIG. 20, an ID of R1 is given to a line segment (road) between a dividing point having an ID of C1 and a dividing point having an ID of C2. This correspondence between each ID and map is stored in the map data preservation unit 20.

If the image frames corresponding to the dividing points C1 and C2 are identified based upon GPS data or the like, it can be known that the panorama image group between the identified image frames corresponds to the road R1. In the example shown in FIG. 20, this panoramic image group contains n images. The image frames corresponding to the dividing points C1 and C2 are given the IDs of C1 and C2, and the images in the panorama image group are sequentially given IDs of R1-1 to R1-n.

Figure 21:
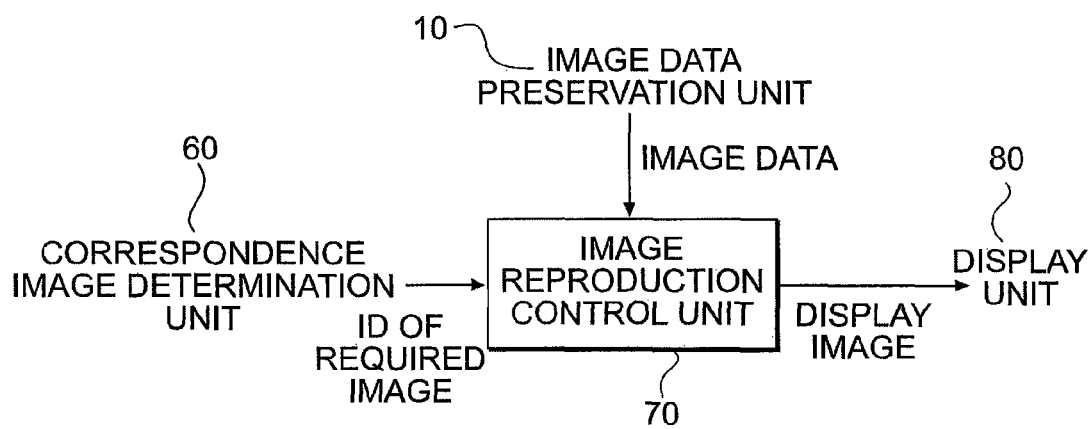
FIG. 21 is a diagram illustrating data flow in an image reproduction control unit 70 of the walk-through system of the second embodiment.

The image reproduction control unit 70 generates an image to be displayed on the display unit 80. FIG. 21 is a diagram showing the data flow of the image reproduction control unit 70. The image reproduction control unit 70 reads from the image data preservation unit 10 the image data corresponding to the image ID of the image determined by the correspondence image determination unit 60, cuts out the panoramic image data corresponding to the angle of view and view direction of an image to be displayed on the display unit 80, and performs projection transformation of the cut-out image data in order to generate an image to be displayed on the display unit 80.

The display unit 80 displays the image of the image data generated by the image reproduction control unit 70.

In the following, selection of a path at a crossing and its corresponding image reproduction control in walk-through reproduction using the image reproducing apparatus 1 will be described. It is assumed that for a dividing point described with FIG. 20 as a crossing capable of selecting a path from a plurality of paths, a road (road ID) to be connected and its connection angle are already registered.

Figure 22:
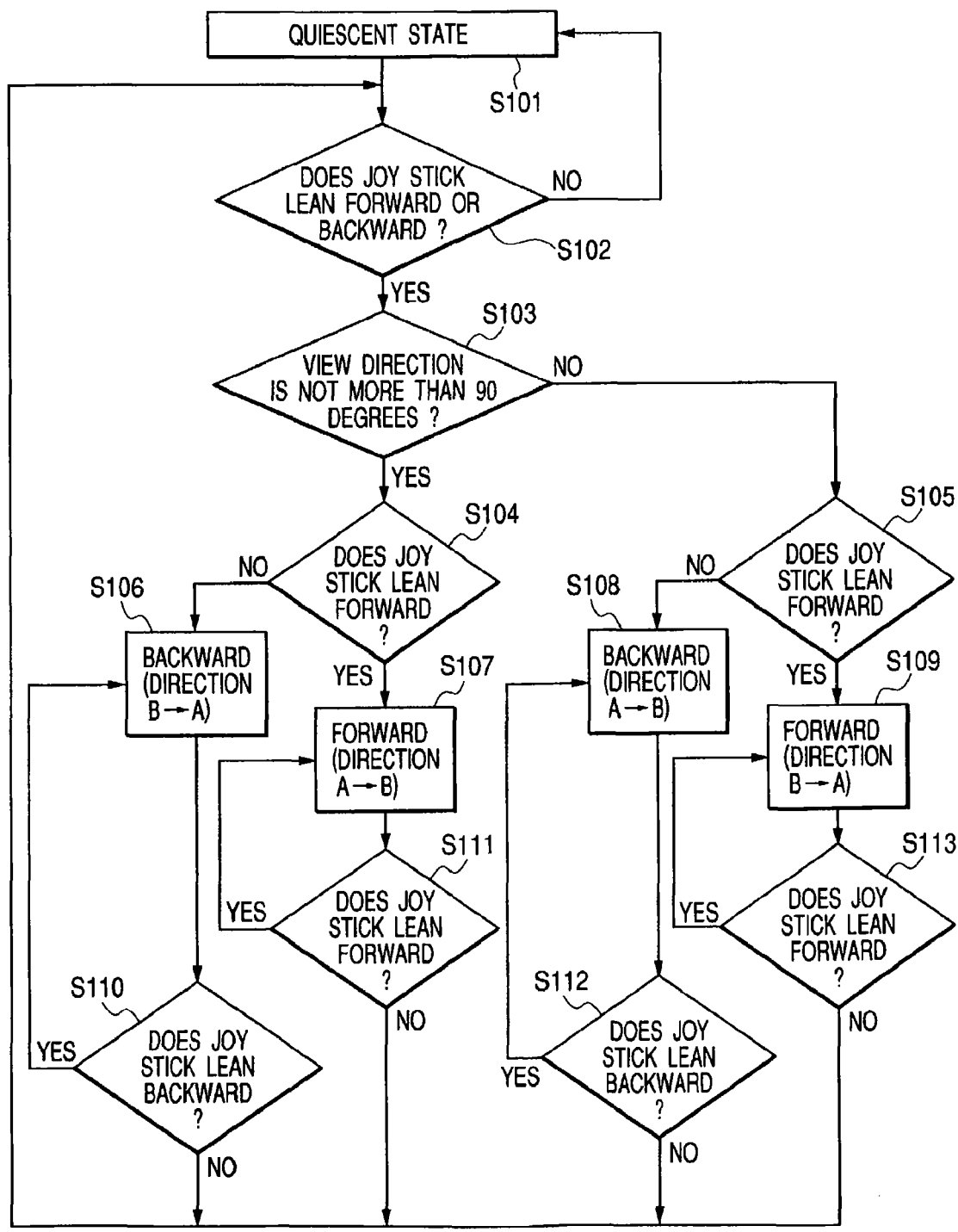
FIG. 22 is a flow chart illustrating advance direction control according to the second embodiment.
Figure 23:
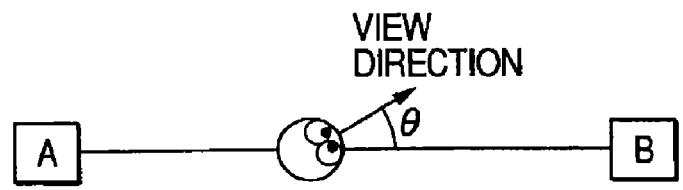
FIG. 23 is a diagram illustrating the advance direction control according to the second embodiment.

A process of determining an advance direction to be executed by the view position and direction determination unit 50 will be further detailed with reference to the flow chart of FIG. 22. The flow chart of FIG. 22 illustrates the procedure used while an observer moves from point A to point B shown in FIG. 23.

At Step S101 an observer is in a quiescent state on the road between point A and point B. At Step S102 it is checked whether the joy stick leans forward or backward. If the joy stick does not lean forward or backward, the flow returns to Step S101, whereas if it leans backward or forward, the flow advances to Step S103.

At Step S103 the view direction of the observer is checked. In the flow chart shown in FIG. 22, the view direction is checked from the angle between the view direction and the direction extending from point A to point B. If the absolute value of the view direction θ relative to the direction extending from point A to point B is 90° or smaller, the forward advance direction is regarded as the advance direction extending from point A to point B (the backward direction is the direction extending from point B to point A), and the flow advances to Step S104. If the absolute value of the view direction θ relative to the direction extending from point A to point B is larger than 90° and equal to or smaller than 180°, the forward advance direction is regarded as the advance direction extending from point B to point A (the backward direction is the direction extending from point A to point B), and the flow advances to Step S105.

At Steps S104 and S105, it is checked whether the joy stick leans forward. If it is judged at Step S104 that the joy stick leans forward, the motion is determined as the forward advance along the direction extending from point A to point B, and the flow advances to Step S107. If the joy stick leans backward, the motion is determined as the backward advance along the direction extending from point B to point A, and the flow advances to Step S106. Similarly, if it is judged at Step S105 that the joy stick leans forward, the motion is determined as the forward advance along the direction extending from point B to point A, and the flow advances to Step S109. If the joy stick leans backward, the motion is determined as the backward advance along the direction extending from point A to point B, and the flow advances to Step S108.

At Steps S106, S107, S108 and S109 the forward or backward advance continues if it is judged at Steps S110, S111, S112 and S113 that the lean direction of the joy stick is the same.

If it is judged at Steps S110, S111, S112 and S113 that the lean direction of the joy stick is reversed or in a quiescent state (the joy stick does not lean), then the flow returns to Step S102.

Figure 24A:
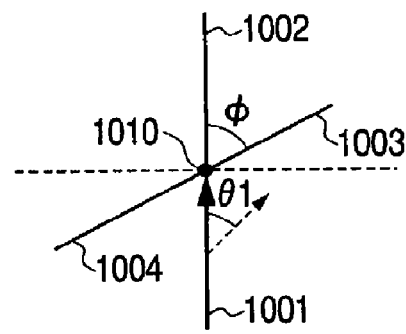
FIGS. 24A, 24B and 24C are diagrams illustrating reproduction control at a crossing according to the second embodiment.
Figure 24B:
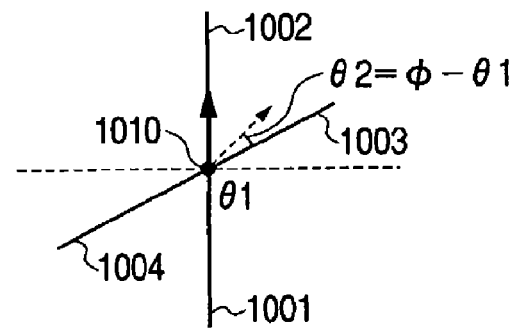
Figure 24C:
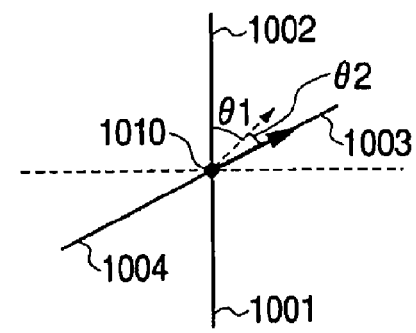

FIGS. 24A to 24C are diagrams illustrating reproduction control at a crossing according to the embodiment. Roads 1001 to 1004 intersect a crossing 1010. The roads 1001 and 1002 and the roads 1003 and 1004 are connected at 180°, and the roads 1002 and 1003 are connected at an angle φ. It is assumed herein that panorama images corresponding to the road 1001 are sequentially used to reproduce images corresponding to the view direction θ1. In this case, a walk-through image can be observed whose view position moves along the road 1001 at the view direction θ1.

In this state, as shown in FIG. 24B, when the reproduced panoramic image reaches the intersection 1010, i.e., when the view position reaches the intersection 1010, the road nearest to the view direction is selected from the roads 1001 to 1004. It is assumed herein that the absolute value (=|φ−θ1|) of the angle θ2 between the road 1003 and the view direction is smallest. In this case, the road 1003 is selected as the road to be used next (FIG. 24C).

Figure 25:
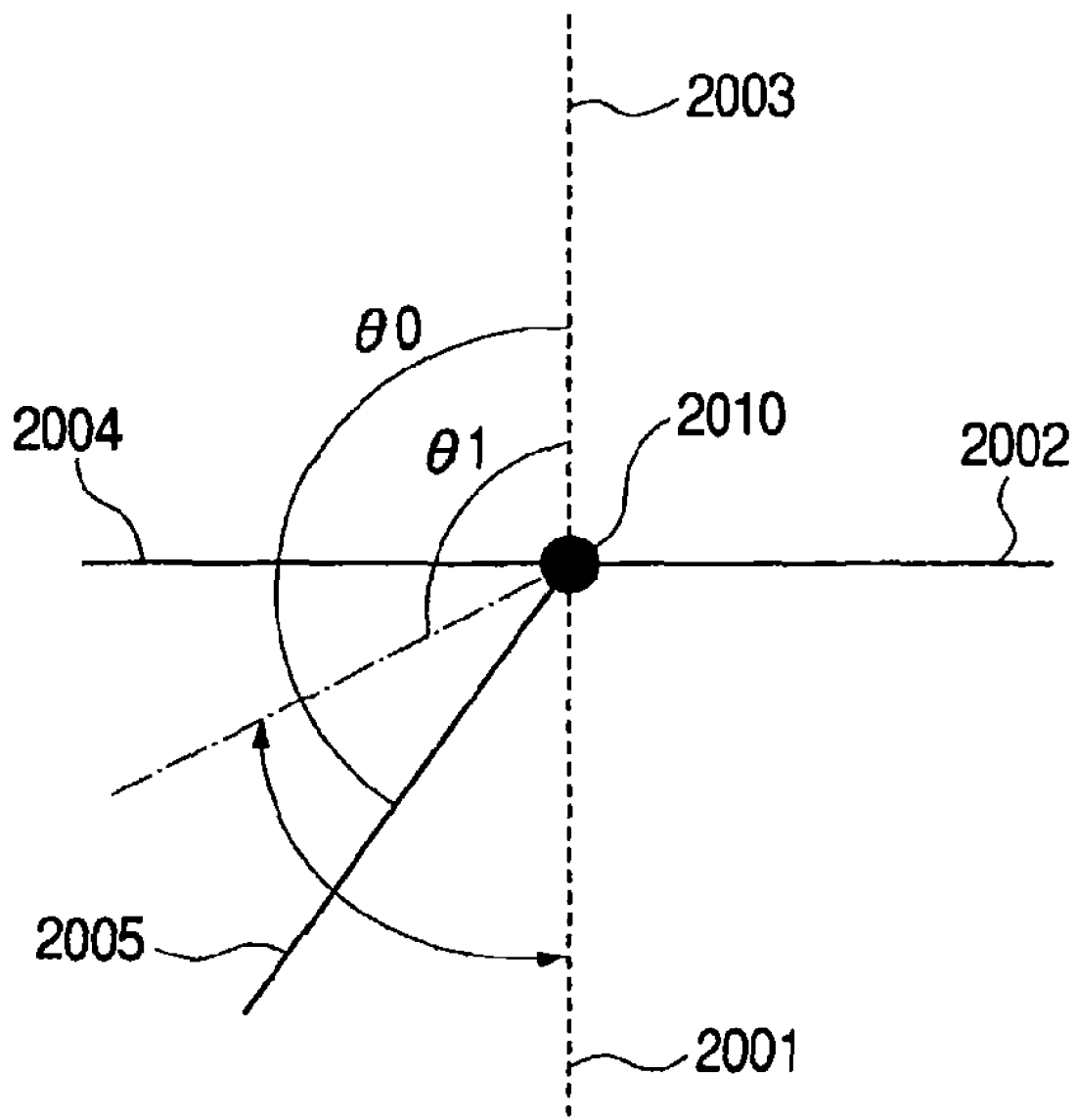
FIG. 25 is a diagram illustrating the reproduction control at a crossing according to the second embodiment.

FIG. 25 is a diagram showing the intersection which requires in a specific case that the absolute value of the view direction relative to the advance direction is larger than 90° and equal to or smaller than 180°. Roads 2001 to 2005 intersect a crossing 2010. The roads 2001 and 2003 and the roads 2002 and 2004 are connected at 180°. In order to advance from the road 2001 via the intersection 2010 to the road 2005 having an angle θ0 (90°<θ0≦180°) relative to the road 2001, after the forward advance on the road 2001 toward the intersection 2010, the view direction is set equal to or larger than θ1 at the crossing 2010.

As above, according to the second embodiment, information of the advance direction during the motion is preserved and the advance direction does not change even if the view direction changes. It is therefore possible to advance to a desired road having an angle of 90° or larger relative to the forward direction of the road presently used.

First Modification of Second Embodiment

In the second embodiment, information of the advance direction while the view position moves is preserved so that it is possible to advance to a desired road having an angle of 90° or larger relative to the direction of the road presently used. In the first modification of the second embodiment, instead of selecting the road nearest to the view direction, a range of the view direction is explicitly designated for each road in order to set a priority order of easiness to turn to a specific road.

Figure 26A:
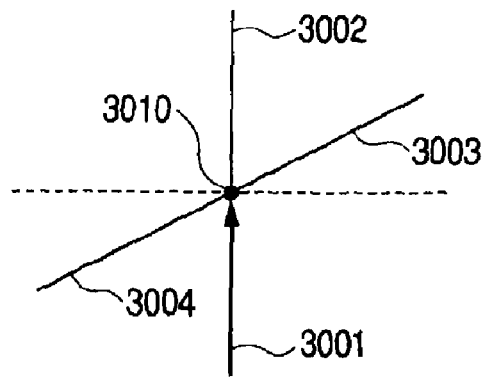
FIGS. 26A, 26B and 26C are diagrams illustrating reproduction control at a crossing according to a first modification of the second embodiment.
Figure 26B:
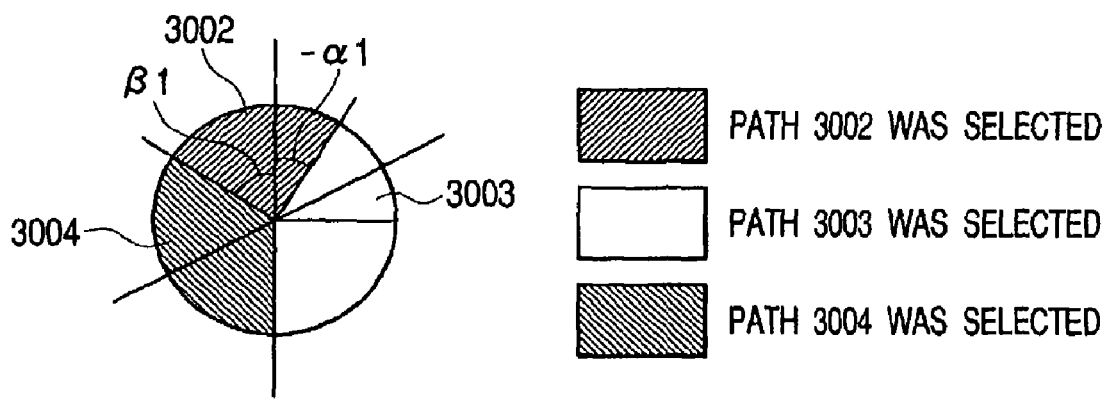
Figure 26C:
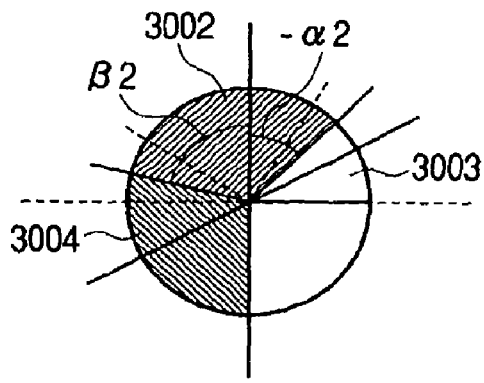

FIGS. 26A to 26C are diagrams illustrating road selection at an intersection according to the first modification of the second embodiment. In selecting a road, instead of determining the range of the view direction for each road through equal division of the angle between adjacent roads as shown in FIG. 26B, the range of the view direction for each road is explicitly designated to set easiness (difficulty) to turn to each road as shown in FIG. 26C. As compared to FIG. 26B, in the example shown in FIG. 26C the range of the view direction for a road 3002 is broadened to make it easy to turn to the road 3003 and difficult to turn to roads 3003 and 3004. Namely, the range of the view direction is broadened from ($-\alpha 1 \leq$ view direction $\leq \beta 1$) to ($-\alpha 2 \leq$ view direction $\leq \beta 2$) where $\alpha 1 > 0$, $\alpha 2 > 0$, $\alpha 1 < \alpha 2$, $\beta 1 > 0$, $\beta 2 > 0$, and $\beta 1 < \beta 2$.

Figure 27:
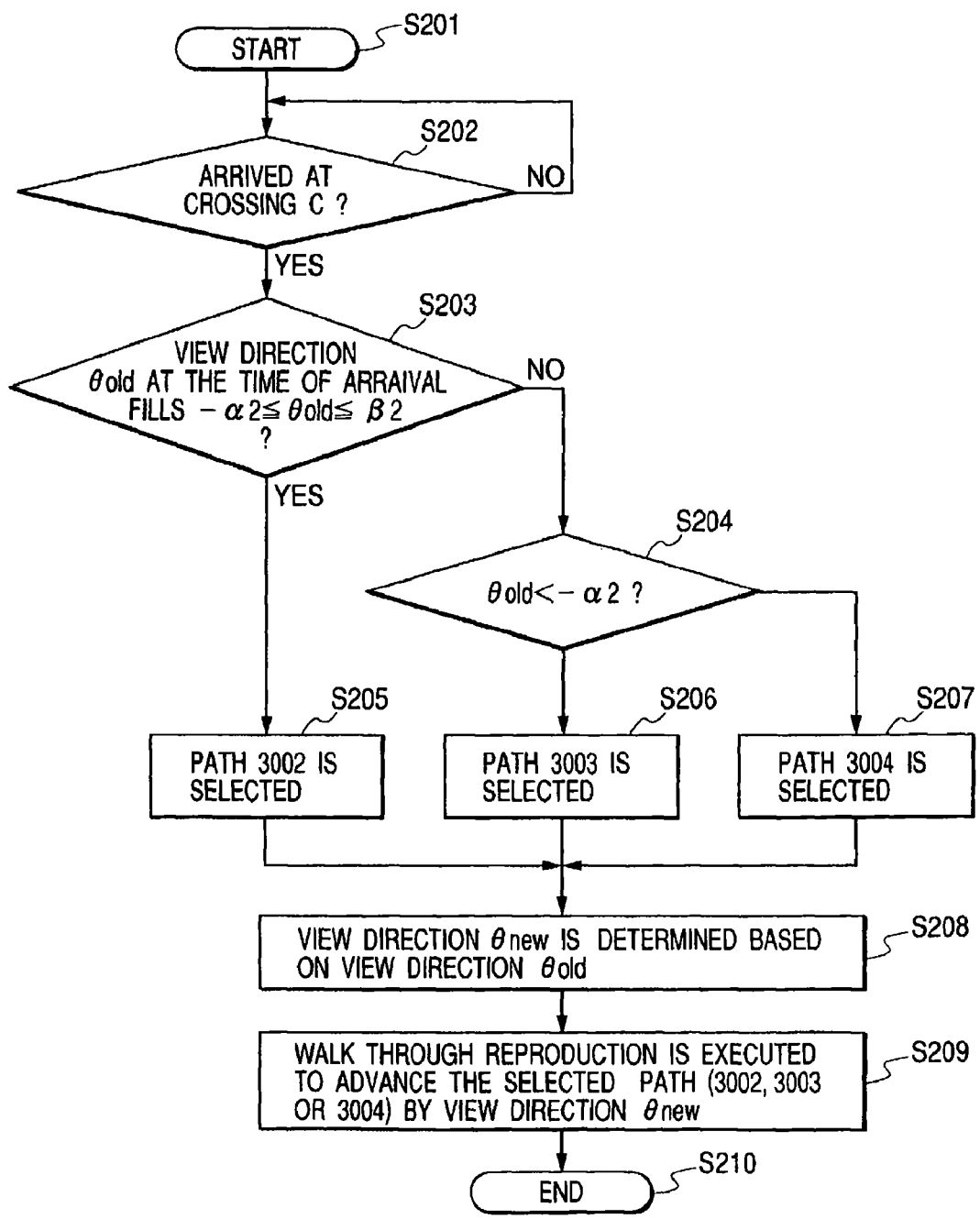
FIG. 27 is a flow chart illustrating the reproduction control at a crossing according to the first modification of the second embodiment.

FIG. 27 is a flow chart illustrating a method of selecting a road at a intersection shown in FIG. 26A according to the first modification of the second embodiment. A process immediately before the advance to the intersection and immediately after the advance to the intersection will be described. In FIG. 27, a crossing C corresponds to the intersection 3010 shown in FIG. 26A, θold corresponds to the view direction relative to the road 3001, and θnew corresponds to the view direction relative to the road (road 3002, 3003 or 3004) selected at the intersection C.

When the image frame corresponding to the intersection C appears after the advance along the road 3001 at the view direction θold at Step S202, it is checked at Step S203 whether the view direction θold is in the range of selecting the road 3002. If the view direction θold is in the range of selecting the road 3002, then at Step S205 the road 3002 is selected. If it is judged at Step S203 that the view direction θold is not in the range of selecting the road 3002, it is checked at Step S204 whether the view direction θold is in the range of selecting the road 3003. If the view direction θold is in the range of selecting the road 3003, the road 3003 is selected at Step S206. If it is judged at Step S204 that the view direction θold is not in the range of selecting the road 3003, the road 3004 is selected at Step S207. At Step S208 in accordance with the selected road and the connection angle of the road relative to the crossing, a view direction θnew coincident with the view direction θold relative to the selected road (road 3002, 3003 or 3004) is set.

At Step S209, walk-through reproduction is performed by using a panoramic image corresponding to the newly selected road and the view direction θnew so that the view position moves along the newly selected road (road 3002, 3003, or 3004).

As above, according to the first modification of the second embodiment, in selecting a road, instead of determining the range of the view direction for each road through equal division of the angle between adjacent roads, the range of the view direction for each road is explicitly designated to set easiness to turn to each road.

Second Modification of Second Embodiment

In the first modification of the second embodiment, in selecting a road at a intersection in accordance with the view direction, it is made easy to turn to the road without equally dividing the angle between adjacent roads that intersects. In the second modification of the second embodiment, a threshold is given to the range of a view direction covered by each road that intersects. If the view direction is not in the range of the threshold, the most straight road is selected to prevent an unnatural direction far away from the view direction from being selected.

Figure 28A:
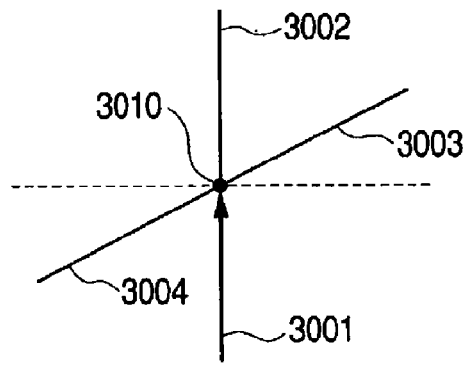
FIGS. 28A, 28B and 28C are diagrams illustrating reproduction control at a crossing according to a second modification of the second embodiment.
Figure 28B:
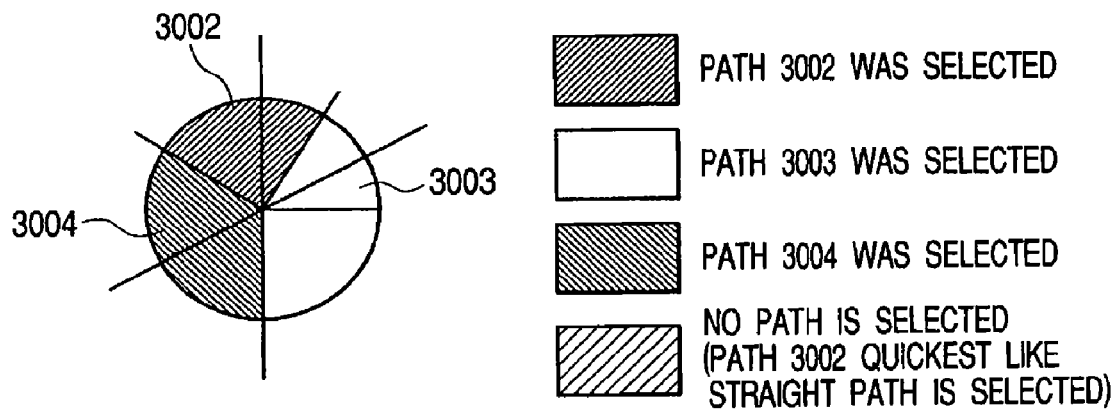
Figure 28C:
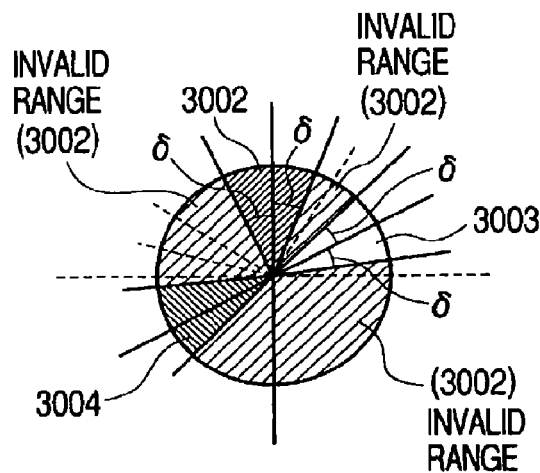

FIGS. 28A to 28C are diagrams illustrating how the road is selected at an intersection according to the second modification of the second embodiment. In FIG. 28B, the roads that intersect cover the full range of 360° view direction. In the second modification of the second embodiment, as shown in FIG. 28C, a threshold δ is set and if the view direction is not in the range of ±δ, the most straight road (in the example shown in FIG. 28C, the road 3002) is selected. Although the common threshold δ is used, a threshold may be set to each road independently. Although the most straight road is selected if the view direction is in the range of the threshold, the road to which the view position advances at the angle nearest to 90° or other roads may also be selected.

Figure 29:
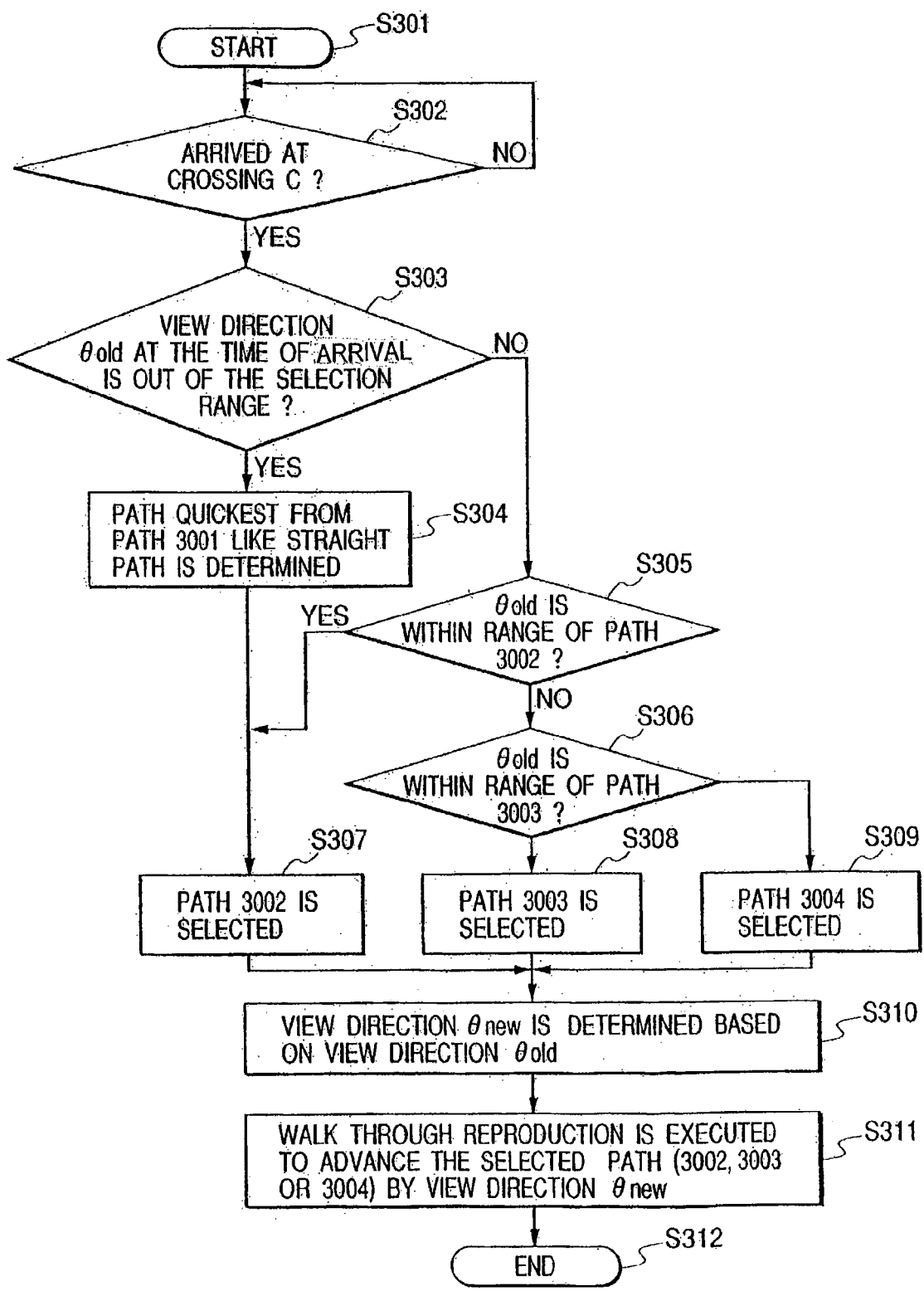
FIG. 29 is a flow chart illustrating the reproduction control at a crossing according to the second modification of the second embodiment.

FIG. 29 is a flow chart illustrating a method of selecting a road at an intersection shown in FIG. 28A according to the second modification of the second embodiment. A process immediately before the advance to the intersection and immediately after the advance to the intersection will be described. In FIG. 29, an intersection C corresponds to the intersection 3010 shown in FIG. 28A, θold corresponds to the view direction relative to the road 3001, and θnew corresponds to the view direction relative to the road (road 3002, 3003 or 3004) selected at the intersection C.

When the image frame corresponding to the intersection C appears after the advance along the road 3001 at the view direction θold at Step S302, it is checked at Step S303 whether the view direction θold is out of the selection range (intersection direction±δ). If the view direction θold is out of the selection range, the most straight road (in this example, road 3002) to be advanced next is selected at Step 304. If it is judged at Step S303 that the view direction θold is in the selection range, then it is checked at step S305 whether the view direction θold is in the range of selecting the road 3002. If the view direction θold is in the range of selecting the road 3002, the road 3002 to be advanced next is selected at Step S307. If it is judged at Step S305 that the view direction θold is out of the range of selecting the road 3002, then it is checked at Step S306 whether the view direction θold is in the range of selecting the road 3003. If the view direction θold is in the range of selecting the road 3003, the road 3003 to be next advanced is selected at Step 308. If it is judged at Step S306 that the view direction θold is out of the range of selecting the road 3003, the road 3004 to be next advanced is selected at Step S309. At Step S310 in accordance with the selected road and the connection angle of the road relative to the intersection, a view direction θnew coincident with the view direction θold relative to the selected road (road 3002, 3003 or 3004) is set.

At Step S311, walk-through reproduction is performed by using a panoramic image corresponding to the newly selected road and the view direction θnew so that the view position moves along the newly selected road (road 3002, 3003, or 3004).

As above, according to the second modification of the second embodiment, in selecting a road nearest to the view direction, a threshold is given to the range of view direction to be covered by each road that intersects. If the view direction is out of the range of the threshold, the most straight road is selected to prevent an unnatural direction far away from the view direction from being selected.

Third Modification of Second Embodiment

In the second embodiment, information of the advance direction during motion is preserved so that a road having an angle of 90° or larger relative to the forward direction of the present road can be selected. In the third modification of the second embodiment, the range of 360° view direction is limited to 180° or smaller. Any road can therefore be selected without changing the view direction by 90° or larger, and even if the view position stops, the road having an angle of 90° or more relative to the forward direction of the present road can be selected without reversing the forward and backward motions.

Figure 30A:
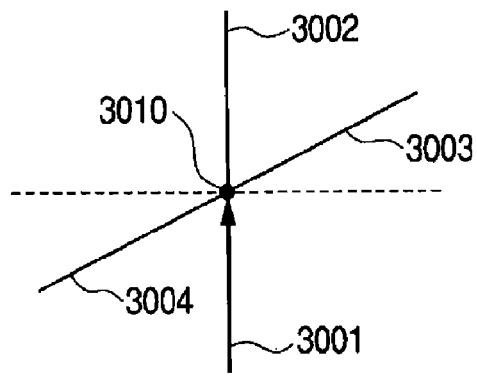
FIGS. 30A, 30B and 30C are diagrams illustrating reproduction control at a crossing according to a third modification of the second embodiment.
Figure 30B:
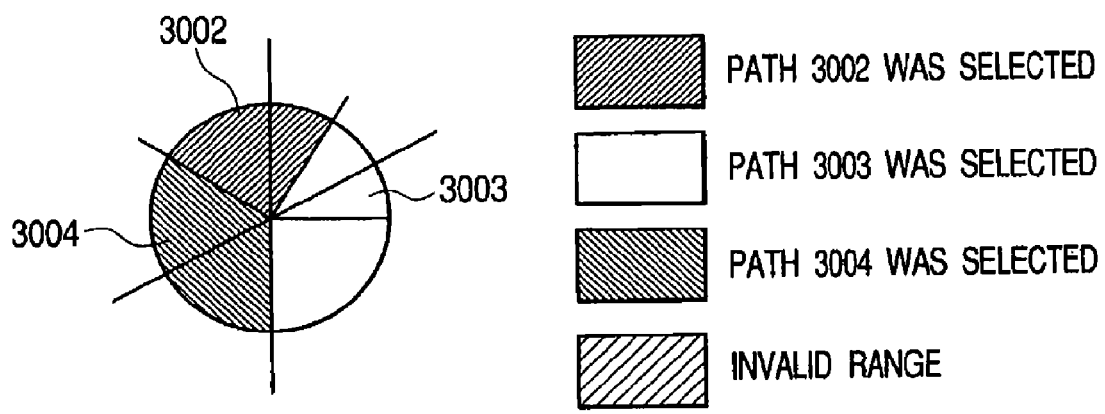
Figure 30C:
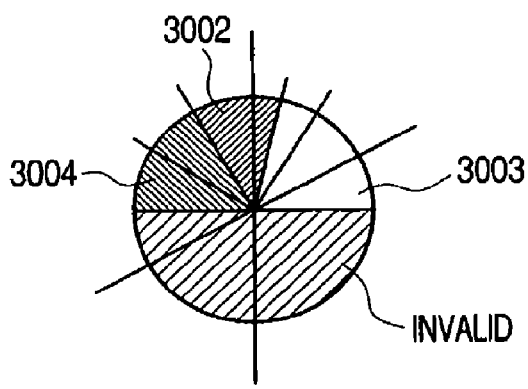

FIGS. 30A to 30C are diagrams illustrating how the road is selected at a crossing according to the third modification of the second embodiment. Instead of using the value of the view direction in selecting the road nearest to the view direction as shown in FIG. 30B, the value of the view direction relative to the present road is multiplied by a as shown in FIG. 30C. The absolute value of the view direction is set to the range from 0° to 90° and each road is selected in the range from 0° to 180° of the absolute value of the view direction. The value α is dependent upon the intersection state of roads.

Figure 31:
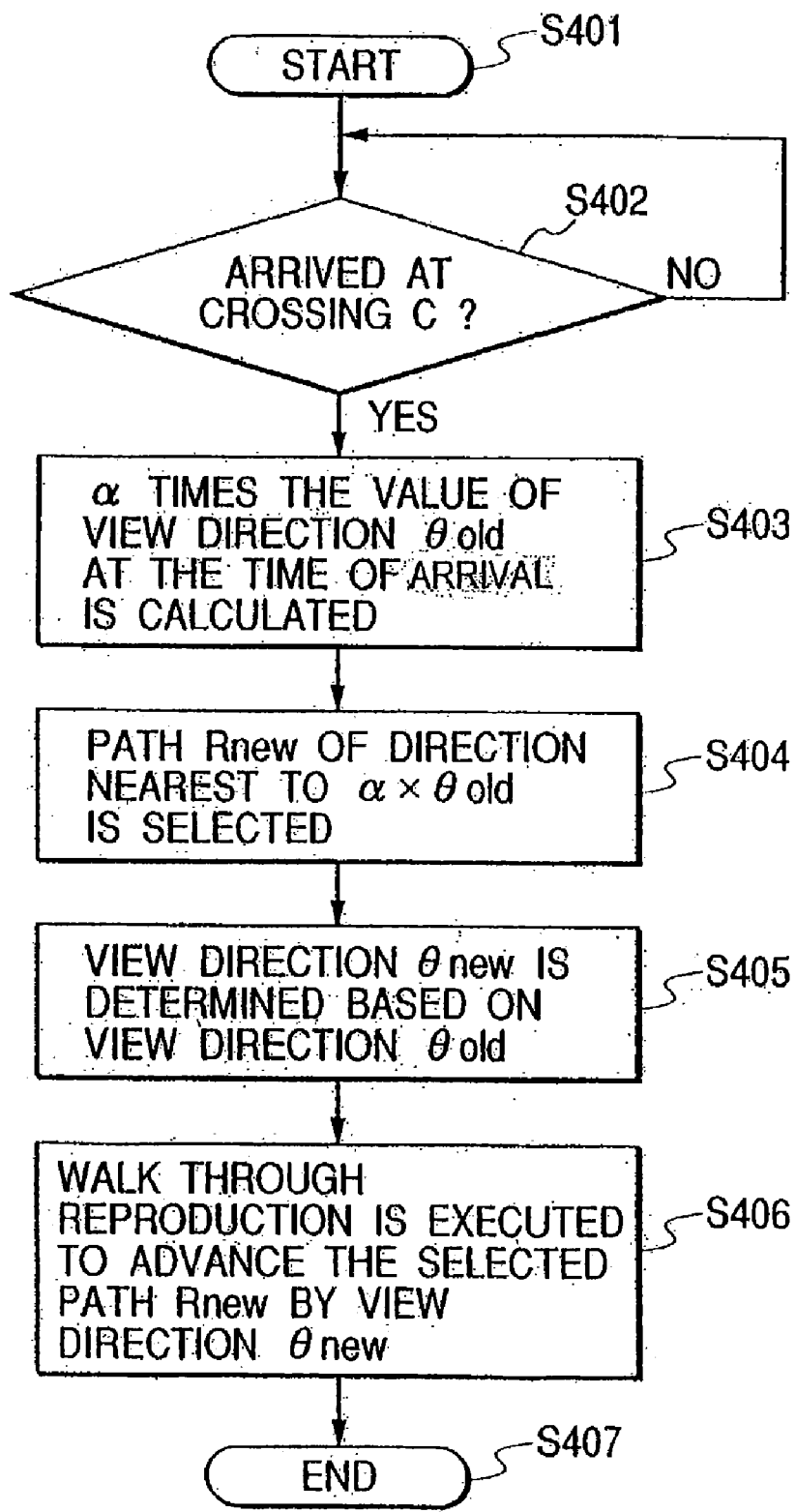
FIG. 31 is a flow chart illustrating the reproduction control at a crossing according to the third modification of the second embodiment.

FIG. 31 is a flow chart illustrating a method of selecting a road at an intersection according to the third modification of the second embodiment. A process immediately before the advance to the intersection and immediately after the advance to the intersection will be described. In FIG. 31, a crossing C corresponds to the intersection 3010 shown in FIG. 30A, θold corresponds to the view direction relative to the road 3001, and θnew corresponds to the view direction relative to the road (road 3002, 3003 or 3004) selected at the intersection C. Rold represents the road 3001 and Rnew represents the road (road 3002, 3003 or 3004) selected at the intersection C.

When the image frame corresponding to the intersection C appears after the advance along the road Rold at the view direction θold at Step S402, the value of the view direction multiplied by α is calculated at Step S403. This value represents a relative angle of the view direction relative to the road Rold while the view position advances to the intersection C. The road Rnew nearest to the view direction of α×θold is selected at Step S404. Next, at Step S405 the view direction θnew coincident with the view direction θold is set for the advance to the road Rnew.

At Step S406 walk-through reproduction is performed by using the panoramic image corresponding to the road Rnew and the view position moves along the road Rnew.

As above, according to the third modification of the second embodiment, any road can be selected without changing the view direction by 90° or larger. Even while the view position stops, a road having an angle of 90° or more relative to the forward direction of the present road can be selected.

Fourth Modification of Second Embodiment

In the fourth modification of the second embodiment, when the view position advances to the crossing in the backward motion state, the road most straight to the present road is automatically selected to realize walk-through which does not make the observer feel uncomfortable, as the view position turns to an unexpected road immediately after arrival at the intersection.

Figure 32A:
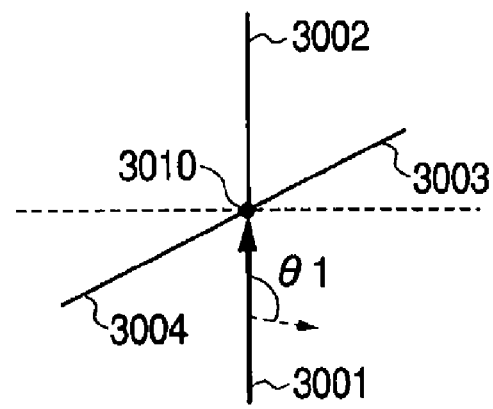
FIGS. 32A, 32B and 32C are diagrams illustrating reproduction control at a crossing according to a fourth modification of the second embodiment.
Figure 32B:
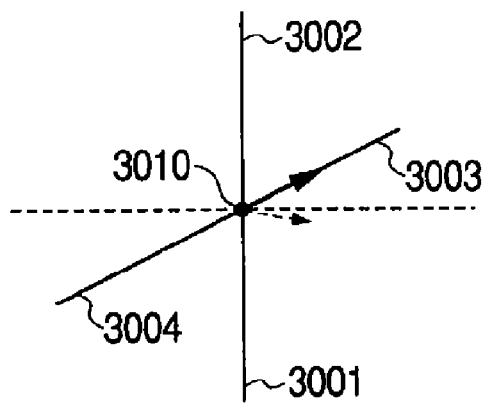
Figure 32C:
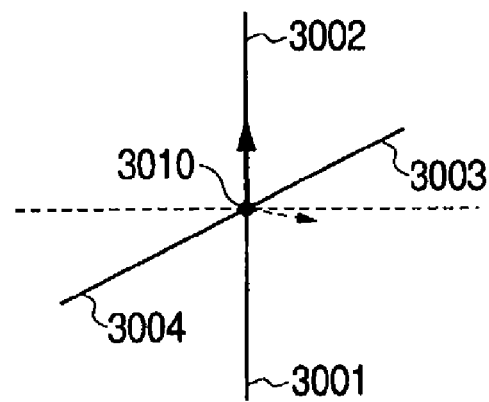

FIGS. 32A to 32C are diagrams illustrating how the road is selected at an intersection when the view position arrives at the intersection during backward motion, according to the fourth modification of the second embodiment. When the view position arrives at a intersection 3010 at the view direction θ1 as shown in FIG. 32A, a road 3003 most nearest to the view direction is selected. However, if the view position arrives at the intersection in the backward direction, the observer cannot know the conditions of the intersection. Therefore, if the view position turns to the road 3003 (FIG. 32B) at the intersection 3010 which the observer does not intend to take and the observer feels uncomfortable. In the fourth modification of the second embodiment, therefore, as shown in FIG. 32C, when the view position arrives at the crossing 3010 in the backward direction, the most straight road is selected (road 3002) irrespective of its view direction.

Figure 33:
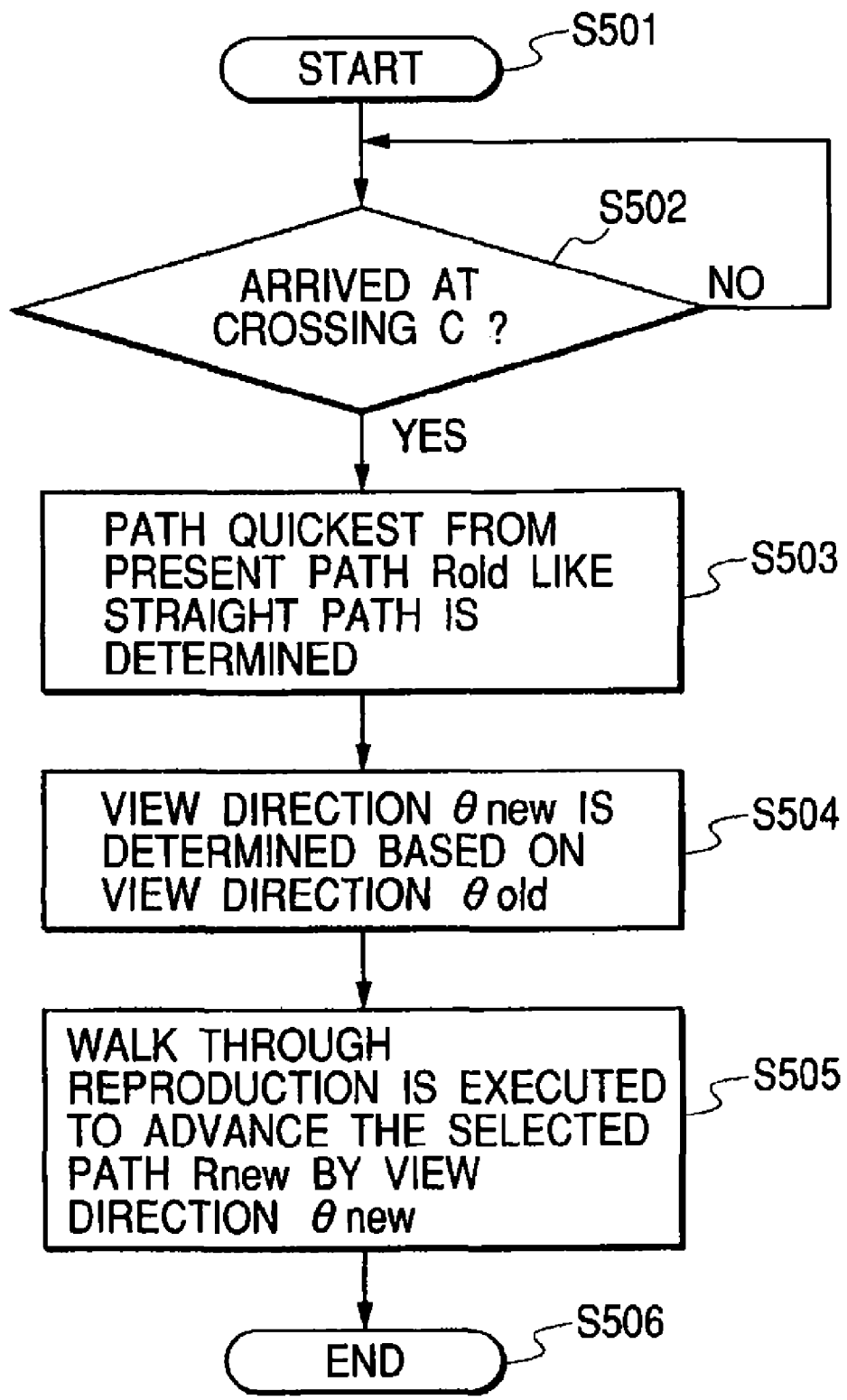
FIG. 33 is a flow chart illustrating the reproduction control at a crossing according to the fourth modification of the second embodiment.

FIG. 33 is a flow chart illustrating a method of selecting a road at an intersection according to the fourth modification of the second embodiment. A process immediately before the advance to the intersection and immediately after the advance to the intersection will be described. In FIG. 33, a crossing C corresponds to the intersection 3010 shown in FIG. 32A, θold corresponds to the view direction θ1 relative to the road 3001, and θnew corresponds to the view direction relative to the road (road 3002, 3003 or 3004) selected at the intersection C. Rold represents the road 3001 and Rnew represents the road (road 3002) selected at the intersection C.

When the image frame corresponding to the intersection C (in the example shown in FIG. 32A, the crossing 3010) appears after the advance along the road Rold (in the example shown in FIG. 32A, the road 3001) at the view direction θold at Step S502, the most straight road Rnew (in the example shown in FIG. 32C, the road 3002) is selected at Step S503. Next, at Step S504 the view direction θnew coincident with the view direction θold is set for the advance of the road Rnew.

At Step S505, walk-through is performed by using by using the panoramic image corresponding to the road Rnew and the view position θnew so that the view point moves along the road Rnew.

As above, according to the fourth modification of the second embodiment, the most straight road relative to the present road can be automatically selected so that the observer does not feel uncomfortable.

Fifth Modification of Second Embodiment

In the fifth modification of the second embodiment, walk-through is performed in which before the arrival at the crossing, the next path is selected in accordance with the view direction and the view direction can be changed as desired when the view position arrives at the intersection.

Figure 34A:
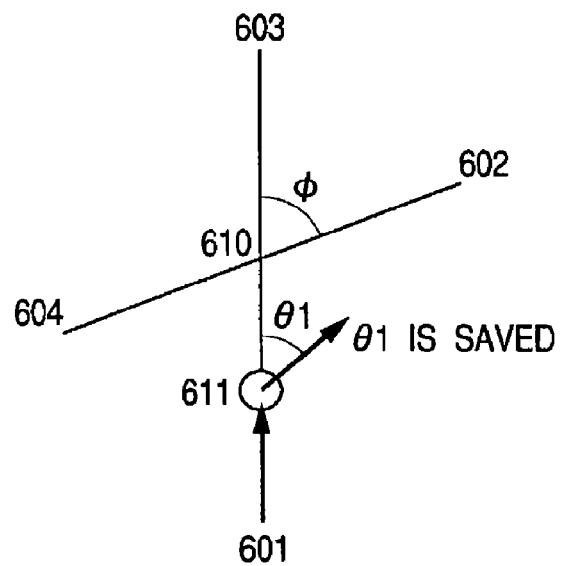
FIGS. 34A, 34B and 34C are diagrams illustrating reproduction control at a crossing according to a fifth modification of the second embodiment.
Figure 34B:
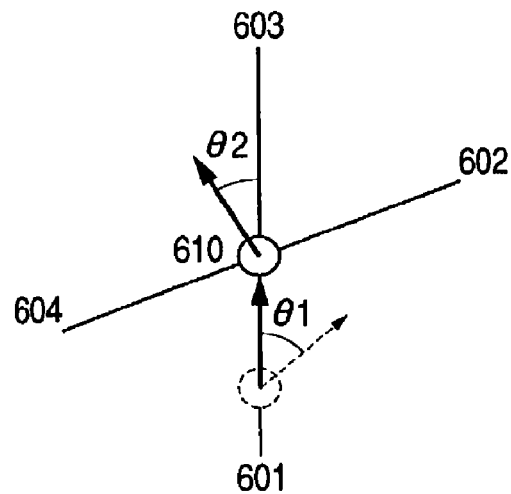
Figure 34C:
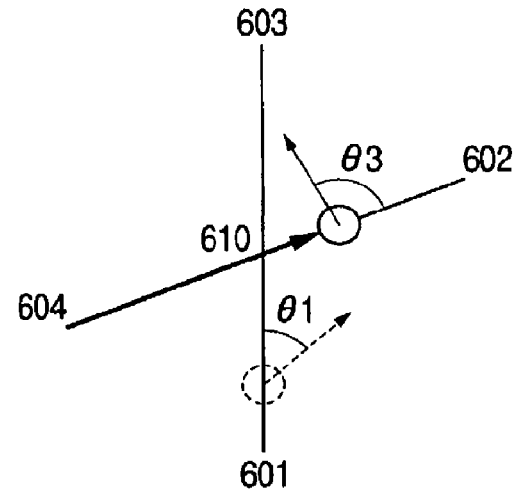

FIGS. 34A to 34C are diagrams illustrating how the road is selected near at a intersection according to the fifth modification of the second embodiment. Roads 601, 602, 603 and 604 intersect an intersection 610. The roads 601 and 603 and the roads 602 and 604 have an angle of 180°. The angle φ between the roads 602 and 603 is smaller than 90°. As shown in FIG. 34A, an observer moves along the road 601 toward the intersection 610 and has the view direction θ1 relative to the road 601. At a point 611 on the road 601, the observer depresses an assignment key of the keyboard or an assignment key of the joy stick to preserve the value of the view direction θ1. The preserved value θ1 is used for selecting the path at the crossing 610. The observer can change the view direction as desired even after the value θ1 is preserved.

As shown in FIG. 34B, when the observer arrives at the intersection 610, a path nearest to not the present view direction θ2 but the preserved view direction θ1 is selected. In this example, it is assumed that the road 602 has the intersection angle nearest to θ1.

As shown in FIG. 34C, after the road 602 is selected at the intersection, the observer moves along the road 602 at the view direction θ3 (=φ+θ2).

Figure 35:
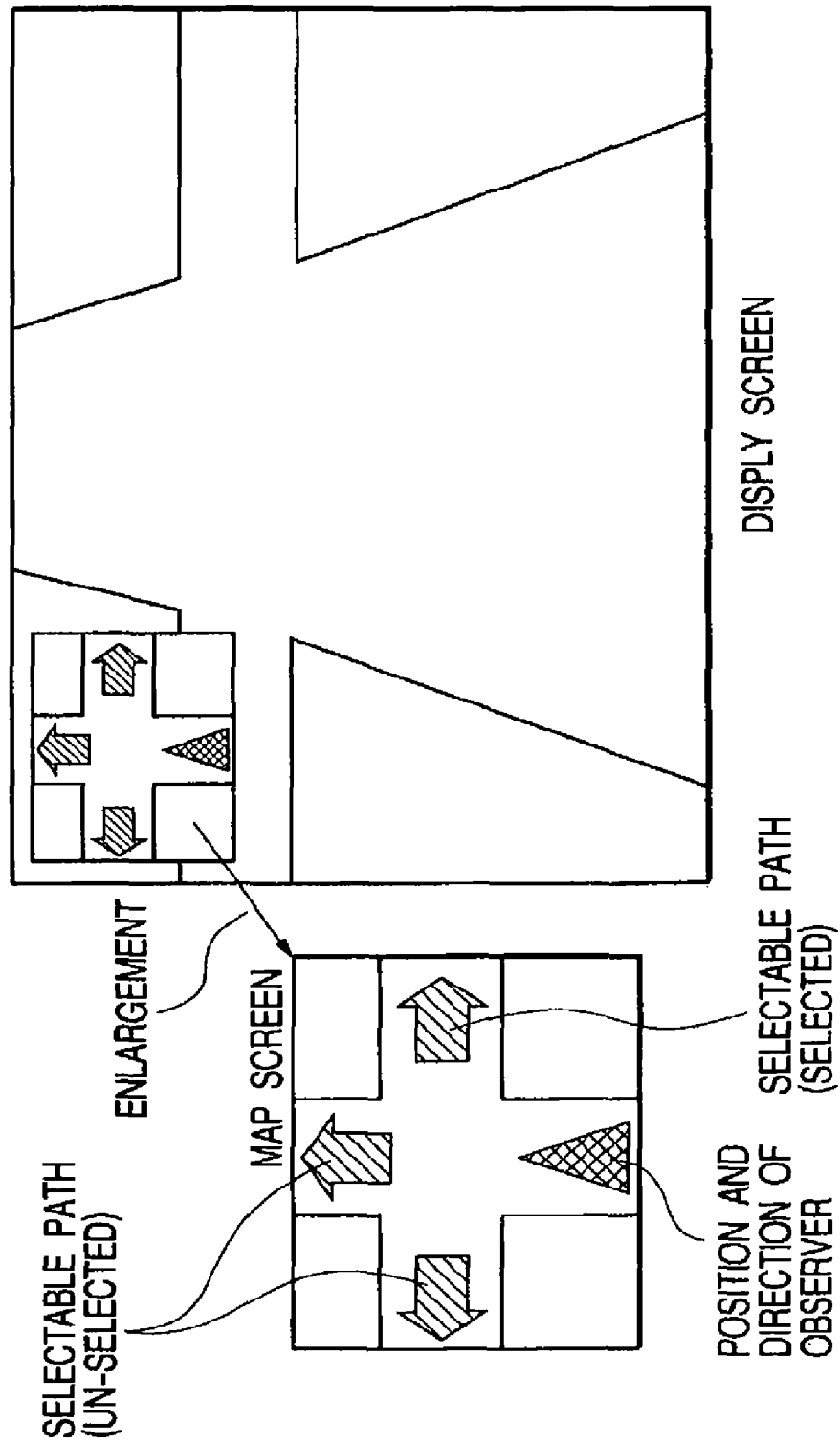
FIG. 35 is a diagram showing a walk-through experience screen according to the fifth modification of the second embodiment.

The value of the view direction to be preserved can be updated a desired number of times by depressing the key. FIG. 35 is a diagram showing a walk-through experience screen. On the walk-through experience screen, a map image is displayed overlaid. On this map image, a view position and a view direction of an observer and arrows indicating selectable paths are displayed. When the view direction is preserved by depressing the key, the color of the arrow indicating the path corresponding to the view direction is changed to the color different from that of the arrows indicating other paths.

Other Embodiments

It is needless to say that the objects of the invention can be realized by supplying a system or an apparatus with a storage medium storing software program codes realizing the function of each embodiment described above and making a computer (CPU or MPU) of the system or apparatus read the program codes stored in the storage medium. In this case, the software program codes themselves read from the storage medium realize the embodiment function. Therefore, the storage medium storing program codes constitutes the present invention. It is obvious that the program codes are included in the embodiment of the invention, wherein not only the computer executes the read program codes to realize the embodiment function but also an OS (operating system) running on the computer or the like executes a portion or the whole of processes in accordance with the program codes.

It is obvious that the scope of the invention also contains the case wherein the functions of each embodiment can be realized by writing the program codes into a memory of a function expansion board inserted into a computer or of a function expansion unit connected to the computer, and thereafter by executing a portion or the whole of actual processes by a CPU of the function expansion board or function expansion unit.

The present invention has been described in connection with the preferred embodiments. The invention is not limited only to the above embodiments. It is apparent that various modifications, improvements, combinations, and the like can be made by those skilled in the art.

What is claimed is:

1. An information processing apparatus for performing walk-through in a virtual space, comprising:
an input unit adapted to input tilt angle information and a rotation parameter from an operation unit;
an obtaining unit adapted to obtain a view position and a view direction of an observer from the tilt angle information and the rotation parameter;
a generation unit adapted to generate a display image from a panoramic image on the basis of the view position and the view direction; and
a display unit to display the generated display image and a map image on which an image indicating the view position and the view direction is displayed,
wherein said obtaining unit determines an advance direction on the basis of the tilt angle information and the rotation parameter,
in a case where the view position is at a position other than a branch point capable of selecting a plurality of advance directions and a direction indicated by the tilt angle information is the same as a direction indicated by previous tilt angle information and the view position is moving, said obtaining unit determines a previous advance direction as an advance direction irrespective of the input rotation parameter, and
in a case where the view position is at the branch point, said obtaining unit selects as an advance direction one of the plurality of advance directions selectable at the branch point in accordance with the rotation parameter.

2. An information processing apparatus according to claim 1, wherein an advance direction is determined according to the rotation parameter when a stop state is changed to a motion state, and the advance direction is not determined according to the rotation parameter when a view point moves along the path.

3. An information processing apparatus according to claim 1, wherein, in a case where the view position is at the branch point said obtaining unit multiplies the rotation parameter by a predetermined value and selects as the advance direction one of the plurality of advance directions selectable at the branch position in accordance with the multiplied result.

4. An information processing method for performing walk-through in a virtual space, the method comprising the steps of:
inputting tilt angle information and a rotation parameter from an operation unit;
obtaining a view position and a view direction of an observer from the tilt angle information and the rotation parameter;
generating a display image from a panoramic image on the basis of the view position and the view direction; and
displaying the generated display image and a map image on which an image indicating the view position and the view direction is displayed,
wherein, in the obtaining step, an advance direction is determined on the basis of the tilt angle information and the rotation parameter,
in a case where the view position is at a position other than a branch point capable of selecting a plurality of advance directions and a direction indicated by the tilt angle information is the same as a direction indicated by previous tilt angle information and the view position is moving, in the obtaining step, a previous advance direction is determined as an advance direction irrespective of the input rotation parameter, and
in a case where the view position is at the branch point, in the obtaining step, one of the plurality of advance directions selectable at the branch point is selected as an advance direction in accordance with the rotation parameter.

5. An information processing method according to claim 4, wherein an advance direction is determined according to the rotation parameter when a stop state is changed to a motion state, and the advance direction is not determined according to the rotation parameter when a view point moves along the path.

6. An information processing method according to claim 4, wherein, in a case where the view position is at the branch point the rotation parameter is multiplied by a predetermined value and selects as the advance direction one of the plurality of advance directions selectable at the branch position in accordance with the multiplied result.

7. A computer-readable storage medium which stores therein a program for achieving an information processing method for performing walk-through in a virtual space, the method comprising the steps of:

inputting tilt angle information and a rotation parameter from an operation unit;

obtaining a view position and a view direction of an observer from the tilt angle information and the rotation parameter;

generating a display image from a panoramic image on the basis of the view position and the view direction; and displaying the generated display image and a map image on which an image indicating the view position and the view direction is displayed, wherein, in the obtaining step, an advance direction is determined on the basis of the tilt angle information and the rotation parameter, in a case where the view position is at a position other than a branch point capable of selecting a plurality of advance directions and a direction indicated by the tilt angle information is the same as a direction indicated by previous tilt angle information and the view position is moving, in the obtaining step, a previous advance direction is determined as an advance direction irrespective of the input rotation parameter, and in a case where the view position is at the branch point, in the obtaining step, one of the plurality of advance directions selectable at the branch point is selected as an advance direction in accordance with the rotation parameter.

8. A computer-readable storage medium according to claim 7, wherein an advance direction is determined according to the rotation parameter when a stop state is changed to a motion state, and the advance direction is not determined according to the rotation parameter when a view point moves along the path.

9. A computer-readable storage medium according to claim 7, wherein, in a case where the view position is at the branch point the rotation parameter is multiplied by a predetermined value and selects as the advance direction one of the plurality of advance directions selectable at the branch position in accordance with the multiplied result.

* * * * *